(12) United States Patent
Chung

(10) Patent No.: US 7,098,793 B2
(45) Date of Patent: *Aug. 29, 2006

(54) TRACKING SYSTEM AND METHOD EMPLOYING PLURAL SMART TAGS

(75) Inventor: Kevin Kwong-Tai Chung, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 122 days.

This patent is subject to a terminal disclaimer.

(21) Appl. No.: 10/398,363

(22) PCT Filed: Oct. 9, 2001

(86) PCT No.: PCT/US01/42563

§ 371 (c)(1),
(2), (4) Date: Apr. 1, 2003

(87) PCT Pub. No.: WO02/31629

PCT Pub. Date: Apr. 18, 2002

(65) Prior Publication Data

US 2004/0036623 A1    Feb. 26, 2004

Related U.S. Application Data

(60) Provisional application No. 60/323,514, filed on Sep. 19, 2001, provisional application No. 60/305,686, filed on Jul. 16, 2001, provisional application No. 60/304,017, filed on Jul. 9, 2001, provisional application No. 60/303,994, filed on Jul. 6, 2001, provisional application No. 60/260,849, filed on Jan. 10, 2001, provisional application No. 60/248,454, filed on Nov. 14, 2000, provisional application No. 60/245,596, filed on Nov. 3, 2000, provisional application No. 60/243,640, filed on Oct. 26, 2000, provisional application No. 60/240,748, filed on Oct. 16, 2000, provisional application No. 60/239,649, filed on Oct. 12, 2000, provisional application No. 60/239,293, filed on Oct. 11, 2000.

(51) Int. Cl.
*G08B 13/14* (2006.01)

(52) U.S. Cl. .............. 340/572.1; 340/5.1; 340/539.13; 340/825.49; 235/376; 235/385

(58) Field of Classification Search ............ 340/572.1, 340/572.7, 568.1, 539.13, 825.49, 5.2, 5.8
See application file for complete search history.

(56) References Cited

U.S. PATENT DOCUMENTS 4,636,950 A    1/1987  Caswell et al.

(Continued)

FOREIGN PATENT DOCUMENTS

EP    0354260    2/2000

(Continued)

OTHER PUBLICATIONS

PCT Written Opinion, Oct. 22, 2003, 10 Pages.

(Continued)

*Primary Examiner*—Benjamin C. Lee
(74) *Attorney, Agent, or Firm*—Dann, Dorfman, Herrell & Skillman, P.C.

(57) ABSTRACT

A system and method are useful for tracking two or more objects moving by separate transport paths to a destination and associating the objects at the destination. Object and check smart tags are associated respectively with each object to be tracked and with an associated check object. Each smart tag includes at least an electronic memory from which information man be transmitted and/or into which information may be stored. Smart tag control units (reader and/or writer) and antenna arrays along the transport path communicate with the smart tags and/or communicate directly or indirectly with one or more processors that process the information. Object and check smart tags are read and compared for matching the object and check object at the destination.

56 Claims, 11 Drawing Sheets

U.S. PATENT DOCUMENTS

| | | | |
|---|---|---|---|
| 4,931,788 A * | 6/1990 | Creswick | 340/10.33 |
| 5,051,565 A | 9/1991 | Wolfram | |
| 5,221,831 A | 6/1993 | Geiszler | |
| 5,257,011 A | 10/1993 | Beigel | |
| 5,259,025 A | 11/1993 | Monroe et al. | |
| 5,272,318 A | 12/1993 | Gorman | |
| 5,291,411 A | 3/1994 | Bianco | |
| 5,313,052 A | 5/1994 | Watanabe et al. | |
| 5,396,218 A | 3/1995 | Olah | |
| 5,401,944 A | 3/1995 | Bravman et al. | |
| 5,412,727 A | 5/1995 | Drexler et al. | |
| 5,465,082 A | 11/1995 | Chaco | |
| 5,485,520 A * | 1/1996 | Chaum et al. | 705/74 |
| 5,533,126 A * | 7/1996 | Hazard | 713/187 |
| 5,627,517 A | 5/1997 | Theimer et al. | |
| 5,650,768 A | 7/1997 | Eswaran | |
| 5,661,470 A | 8/1997 | Karr | |
| 5,682,142 A * | 10/1997 | Loosmore et al. | 340/572.1 |
| 5,745,036 A | 4/1998 | Clare | |
| 5,798,693 A | 8/1998 | Engellenner | |
| 5,841,786 A * | 11/1998 | Keyes | 714/718 |
| 5,842,555 A | 12/1998 | Gannon et al. | |
| 5,886,634 A | 3/1999 | Muhme | |
| 5,914,671 A | 6/1999 | Tuttle | |
| 5,917,174 A | 6/1999 | Moore et al. | |
| 5,920,261 A | 7/1999 | Hughes et al. | |
| 5,963,136 A | 10/1999 | O'Brien | |
| 5,971,279 A | 10/1999 | Raistrick et al. | |
| 6,002,344 A | 12/1999 | Bandy et al. | |
| 6,100,804 A | 8/2000 | Brady et al. | |
| 6,111,506 A | 8/2000 | Yap et al. | |
| 6,150,942 A | 11/2000 | O'Brien | |
| 6,198,382 B1 * | 3/2001 | Berger et al. | 340/10.34 |
| 6,211,781 B1 | 4/2001 | McDonald | |
| 6,222,452 B1 | 4/2001 | Ahlstrom et al. | |
| 6,232,877 B1 | 5/2001 | Ashwin | |
| 6,294,999 B1 | 9/2001 | Yarin et al. | |
| 6,353,406 B1 | 3/2002 | Lanzl et al. | |
| 6,397,190 B1 | 5/2002 | Goetz | |
| 6,427,913 B1 | 8/2002 | Maloney | |
| 6,463,537 B1 * | 10/2002 | Tello | 713/182 |
| 6,490,513 B1 * | 12/2002 | Fish et al. | 701/35 |
| 6,556,942 B1 | 4/2003 | Smith | |
| 6,574,166 B1 | 6/2003 | Niemiec | |
| 6,883,710 B1 * | 4/2005 | Chung | 235/385 |
| 2001/0028308 A1 | 10/2001 | DeLa Hueroa | |
| 2002/0063622 A1 | 5/2002 | Armstrong et al. | |

FOREIGN PATENT DOCUMENTS

| | | |
|---|---|---|
| EP | 1178432 | 2/2002 |
| WO | WO 99/45498 | 9/1999 |
| WO | WO00/77536 | 12/2000 |
| WO | WO 01/54055 | 7/2001 |
| WO | WO 02/31629 | 4/2002 |

OTHER PUBLICATIONS

En-Vision America, "Welcome to our Homepage," en-Vision America—Specializing in assistive technology products for Low Vision and Blindness. Indep . . . http://www.envisionamerica.com/grindes.html, 14 Pages.

International Search Report, PCT, Sep. 18, 2002, 4 Pages.

* cited by examiner

TRACKING SYSTEM AND METHOD EMPLOYING PLURAL SMART TAGS

This Application is the National Stage of PCT International Application No. PCT/US01/42563 filed Oct. 9, 2001, which claims the benefit of:

U.S. Provisional Application Ser. No. 60/239,293 filed Oct. 11, 2000,
U.S. Provisional Application Ser. No. 60/239,649 filed Oct. 12, 2000,
U.S. Provisional Application Ser. No. 60/240,748 filed Oct. 16, 2000,
U.S. Provisional Application Ser. No. 60/243,640 filed Oct. 26, 2000,
U.S. Provisional Application Ser. No. 60/245,596 filed Nov. 3, 2000,
U.S. Provisional Application Ser. No. 60/248,454 filed Nov. 14, 2000,
U.S. Provisional Application Ser. No. 60/260 849 filed Jan. 10, 2001,
U.S. Provisional Application Ser. No. 60/303,994 filed Jul. 6, 2001,
U.S. Provisional Application Ser. No. 60/304,017 filed Jul. 9, 2001,
U.S. Provisional Application Ser. No. 60/305,686 filed Jul. 16, 2001,
U.S. Provisional Application Ser. No. 60/323,514 filed Sep. 19, 2001, and U.S. patent application Ser. No. 09/854,722 filed May 14, 2001.

The present invention relates to an article tracking system and method, and in particular, to an article tracking system and method employing plural smart tags.

Typically, shipping and receiving utilizes paper documents such as bills of lading and manifests and/or paper labels that relate the objects being shipped or transported to their owner or to the designated or authorized recipient. Such documents and labels often include a bar code for automatic reading by an optical scanner that is in line-of-sight communication with the bar code. In such operations there is usually a desire to maintain a complete, accurate and up to date record of the objects shipped and received. Automated or automatic methods of providing such record are desirable, however, conventional methods all have shortcomings that result in less than the desired tracking and record being provided.

Labels applied to the objects were an attempt to afford relative automated record keeping, but tended to be cumbersome to use and error prone. More sophisticated automatic methods employed bar-coded labels and/or magnetic stripe tags, each with suitable readers. While the cost of such labels and cards is low, so is the information that can be embedded or coded in either of these media. In addition, most readers are read-only devices and cannot store any additional information in the bar-code label or magnetic stripe card.

Moreover, bar-code media require a "line-of-sight" communication path between device and reader, and magnetic stripe media require a direct or close contact communication path between device and reader at a suitable "swiping speed," and the reliability of correct reading is about 80–90%, as anyone who has gone through a store check-out bar-code reader or a magnetic stripe credit card reader will recognize. Repeated passes of the object in front of the bar-code reader or swipes of the card reader create delay and annoyance and/or can produce record errors.

Electronic tracking using radio frequency identification (RFID) tags is one way to overcome the disadvantages of the prior art bar-code and magnetic stripe approaches. Prior art systems typically do not track the articles to be tracked along the processing path and/or do not have reliable, essentially 100% correct reader performance, essentially without the need for human intervention, as is desirable for providing complete and accurate records.

In a shipping/receiving/transport operation, or in a luggage/baggage checking operation, or in a medication dispensing operation, for example, the object or article (goods transported, luggage, baggage, medication) is necessarily separated from the conventional paper document (bill of lading, manifest, baggage check, prescription) that contain the necessary information relating to each object or article. Bar-coded labels and magnetic stripe cards have not proved completely satisfactory due to the need for line-of-sight readers and significantly less than 100% reading rate.

Accordingly, there is a need for a tracking system and method that can track an object at various stations and that facilitates associating the object with a desired recipient. It would be advantageous if the method and system has a very high correct-reading ability (e.g., approaching 100%), and does not require line-of-sight readers.

To this end, the system of the present invention for matching at a destination first and second objects associated respectively with first and second smart tags, comprises at least first and second smart tags associated at an origin location with first and second objects, the first and second smart tags each including a memory, and at least one smart tag writer at the origin location for storing in the respective memories of the first and second smart tags information relating to both the first and second objects. A smart tag reader at the destination location reads information from the respective memories of the first and second smart tags, and a processor provides an indication of whether the information read from the respective memories of the first and second smart tags both include the information relating to both the first and second objects.

BRIEF DESCRIPTION OF THE DRAWING

The detailed description of the preferred embodiments of the present invention will be more easily and better understood when read in conjunction with the FIGURES of the Drawing which include.

Figure 1:
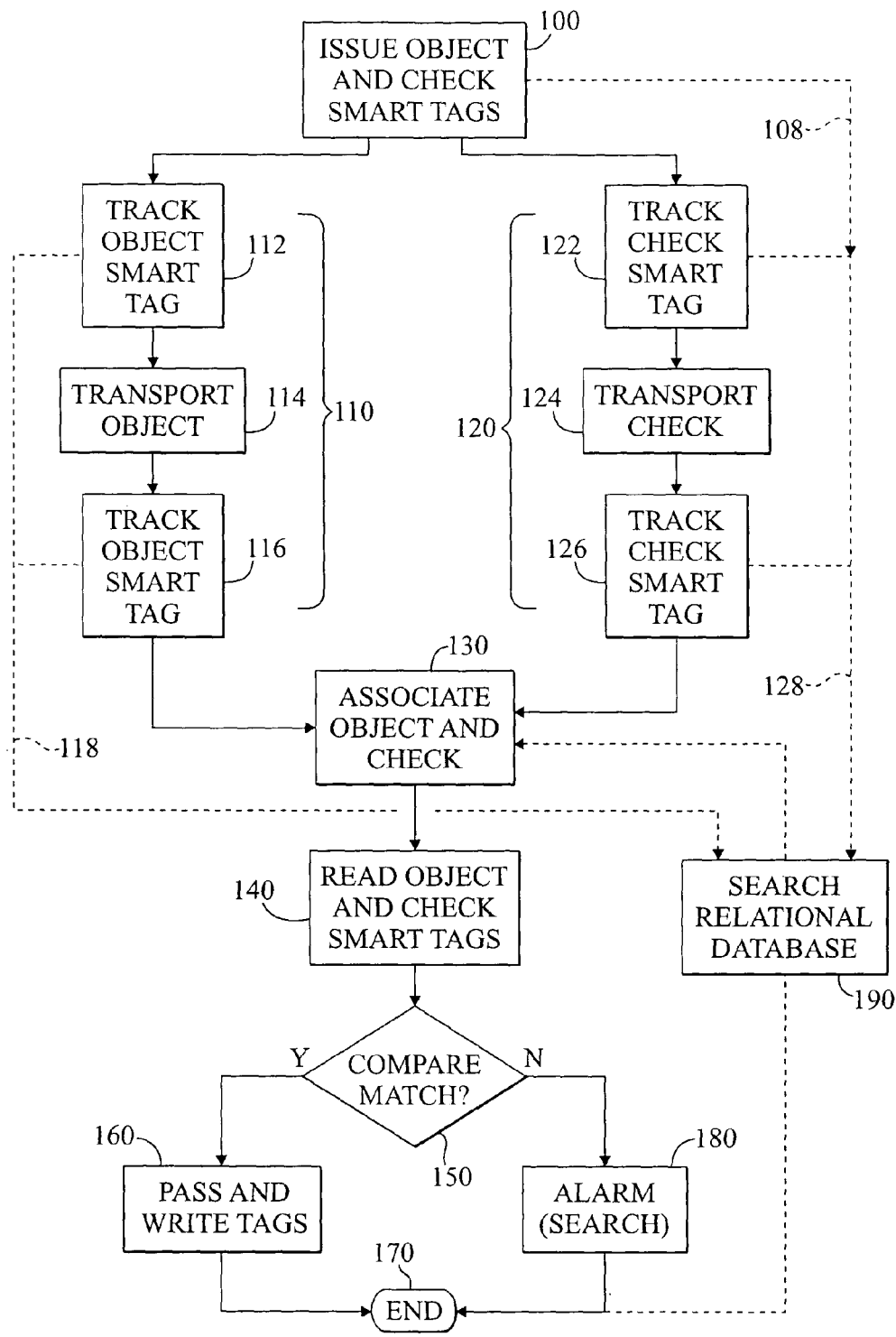
FIG. 1 is a flow chart schematic block diagram illustrating an example embodiment of a tracking system and method in accordance with the invention.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similar elements may be shown in the same figure designated by different "dash numbers" such as X-1, X-2, and so on. It is noted that, according to common practice, the various features of the drawing are not to scale, and the dimensions of the various features are arbitrarily expanded or reduced for clarity.

DESCRIPTION OF THE PREFERRED EMBODIMENT

In general, a system according to the invention is useful for tracking an article or object at a plurality of stations over a transport path and associating the article or object with a recipient or another object. A smart tag is associated with each article to be tracked, for example, by being attached to the article either directly or indirectly, e.g., to a container containing the article. A second smart tag is associated with the recipient or other object with which the first object is to be associated after passing along the transport path. Each smart tag includes at least an electronic memory coupled to an antenna by which information from the memory may be transmitted and/or information may be received and stored in the memory. Smart tag control units (readers and/or writers) and antenna arrays at various stations communicate with the smart tags and may also communicate directly or indirectly with one or more processors that process the information, for example, for monitoring and/or controlling the stations and/or control units and/or lines including one or more stations.

As used herein, the following terms are used to include but are not limited to:

"Article" and "object" and "person" are used interchangeably to refer to any article, object or other thing or person or animal to which a smart tag may be attached or with which a smart tag may be associated. Examples include, but are not limited to, packages, parcels, containers, baggage, luggage and the like in a transport or travel environment, and medications, instruments, implements, containers therefor and the like in a medical or hospital environment. A person may be an "object" in, for example, a travel environment where the invention is utilized for associating a person as passenger with his baggage.

"Electronic gate" is used to refer to an array of antenna in combination with a smart tag reader/writer that communicates with a smart tag via the antenna array, and which may also include a display, annunciator or other device for providing information in human perceivable form. The antenna array may be disposed at an entry point or other location of a station for receiving information produced from a smart tag that is within its detection region and for transmitting information to be stored in the memory of a smart tag within its detection region.

"Smart tag" is used to refer to an article that includes at least an electronic memory wherein information from the memory may be transmitted and/or information may be received and stored in the memory. A "wireless" type smart tag including an antenna is preferred, wherein the information is electromagnetically coupled from or to the antenna over a distance or range. However, a "contact" type smart tag, wherein the information is electrically coupled through physical electrical connections made to contacts on the smart tag, may also be utilized, although it is less convenient.

"Station" is used to refer to any booth, station, gate, portal, check-in position, baggage claim, check point, dispensing location, manufacturing or processing location, ramp, conveyor, conveyance, shipping area, receiving area, and the like that one or more objects may be at or pass at which a smart tag may be issued, read, written to, and/or collected.

"Transport path" is used to refer to any path, route, conveyor, conveyance, carriage or other means or combination of means by which an object, article or person may move or be moved from one place to another.

FIG. 1 is a flow chart schematic block diagram illustrating an example embodiment of a tracking method in accordance with the invention. The process illustrated is described in general terms and then is described in terms of examples of utilizations of the invention, such as a baggage checking in a travel environment and a medication tracking in a medical environment. For simplicity, the invention is described in terms of two smart tags associated respectively with two objects, although any number of smart tags and/or objects may be associated and tracked as a set or group. E.g., one traveler may check two or more bags, or one patient may receive two or more medications or receive medication at two or more times.

The process of FIG. 1 commences with the issuing 100 of plural smart tags coded with related information, typically two smart tags where a tracked object is to move over a transport path that differs in some respect from the transport path over which a check object moves. Typically, the tracked object and the checked object are associated at the beginning of the transport path, such as by being in the same location or origin, or by being in possession of one person, and are to be again associated at the end of the transport path, such as at a pick-up location, collection point or other destination. The smart tag issued to be attached to or associated with the tracked object is referred to as the object smart tag and the smart tag to be associated with the check object is referred to as the check smart tag.

The information stored in the memory of each smart tag when issued 100 may include any one or more of the identity of the tag, the object, the owner and/or sender and/or recipient, the origin or destination, the route, routing and/or other transport path information, the carrier(s), date and time information, issuing location and personnel, and/or any other desired or useful information. Such information is written into the memory of each smart tag as is an identifier associating each of the plural smart tags relating to a particular object or set of objects with the other or others. The smart tags will typically be flexible so that they can easily conform to a label or tag or paper receipt to which they are attached, e.g., adhesively.

The tracked object is tracked 112, 116 by reading the smart tag associated with it as it is transported 114 over transport path 110. For example, the tracked object is tracked 112 as it begins being transported 114 and is tracked 116 as it completes being transported and is to be associated 130 with the checked object. Steps 112–116 may represent the transport path 110 or one segment of a plural segment transport path 110 indicated by the dashed portion of the arrow emanating from box 116. Any number of transport segments 114 and tracking points 112, 116 may be utilized along the transport path 110.

The check object is tracked 122, 126 by reading the check smart tag associated with it as it is transported 124 over transport path 120. For example, the check object is tracked 122 as it begins being transported 124 and is tracked 126 as it completes being transported and is to be associated 130 with the tracked object. Steps 122–126 may represent the transport path 120 or one segment of a plural segment transport path 120 indicated by the dashed portion of the arrow emanating from box 126. Any number of transport segments 124 and tracking points 122, 126 may be utilized along the transport path 120.

Tracking and monitoring movement of the object smart tags and check smart tags may be accomplished in several different ways. Each tracking 112, 116, 122, 126 may include, in addition to reading information from the smart tag, the writing of tracking information to the smart tag so that as the smart tag moves along the transport path it accumulates information identifying the tracking 112, 116, 122, 126 electronic gates it passes and the date and time thereof. Tracking information may include, for example, the identity of each tracking station passed and the date and time thereof. Thus, each smart tag always has the history of its travel stored in its memory, which tracking information can be read should the object and its smart tag not be in the expected destination when expected.

Alternatively and/or additionally, such tracking information can be communicated along with smart tag identifying information to a processor and stored in a relational database for easy and quick reference and access as needed or desired, as described below. Further, and also alternatively and/or additionally, such tracking information and tag identity information can be stored in the smart tag reader associated with each electronic gate at which tracking 112, 116, 122, 126 occurs, for later retrieval, as and/or if needed.

The tracked object and the checked object are associated 130 at the end of their respective transport paths 110, 120 and the object and check smart tags associated with the tracked object and the check object, respectively, are read 140. The information read 140 from the two smart tags is compared 150 to determine whether they match 150, i.e. whether the object smart tag and the check smart tag were issued 100 together containing the proper relating information that was written therein at issuing 100.

If a match 150 is found (path "Y"), the tracked and checked objects pass 160 from the tracking process which ends 170. The object smart tag and check smart tag may go with the objects, preferably with the writing 160 of information to the smart tags indicating that they have been matched with the objects to be matched or erasing the information stored in the smart tags that relates to the objects being tracked. One or both of the object and check smart tags may be collected, and so are available to be erased and reused, and are unavailable for unauthorized attempts at reuse.

If a match 150 is not found (path "N"), as will occur if only one of the object and check smart tags is present without a properly matched companion tag, or if the object and check smart tags present do not contain proper relating information, or if an additional unrelated smart tag is present. In these cases, an alarm 180 may be given by any suitable means, such as a light, audible signal, signal to an official or police, or combination thereof, and the process ends 170.

Alternatively and/or additionally, if a match 150 is not found, a search 180 is initiated for the missing one of the object smart tag or the check smart tag relating to the smart tag that was read 140. A search 190 is preferably conducted by identifying the records of a relational data base that includes a record for each smart tag each time it is read at any one or more of the electronic gates. Issuing 100 and tracking 112, 116 of object smart tags and tracking 122, 126 of check smart tags both include reading and/or writing of information to and/or from the memory of the smart tag and communicating 118, 128 such read and/or written information to a relational database running on a processor. As smart tags are issued 100 and tracked (read) 112, 116, 122, 126, 140, records are accumulated in the relational database that provide a chronology and history of the transport of both object and check smart tags so that their most recent location and complete travel history are readily available.

Considering FIG. 1 in the travel or transport environment wherein baggage and luggage are checked at an origin and returned or delivered at a destination, for example, travel between airline terminals in an airplane, or between stations on a train or between ports on a ship. When a passenger checks in, an object smart tag is issued 100 and applied to his baggage, and a baggage check including a check smart tag is issued 100 to the passenger. The checked baggage passes through the baggage system of the terminal where it is tracked 112 and loaded to be transported 114, e.g., in a baggage compartment or car or container. Note that the baggage may be tracked at the check-in position, at various places of the baggage system of the terminal and/or as it is loaded onto the conveyance, as well as in the baggage compartment of the conveyance.

The passenger is tracked 122 as he moves in the terminal and/or as he enters the gate and/or boards the conveyance to be transported 124, e.g., in the passenger areas thereof. Note that passenger tracking may be at the check in position, at various locations in the terminal, and/or at the gate, as well as at the entry to the conveyance. Carry-on baggage may also be checked in and a check smart tag issued 100 therefor and tracked 122, 126 in like manner.

An advantage of the foregoing is that each piece of baggage, whether checked or carried by the passenger can be easily compared to the passengers that actually board the conveyance, as is desirable, for example, for 100% matching of passengers and baggage for air travel security purposes. Thus, any baggage loaded for which the corresponding passenger has not boarded (potential security concern) and any passenger's baggage not loaded or being loaded on the wrong conveyance (potential lost bag concern) may be detected and monitored, and appropriate action initiated. Appropriate action could include re-routing mis-routed bags, whether manually or automatically by a robotic or other mechanical device.

After transport 114, 124, the baggage is tracked 116 as it is unloaded and moved to a baggage claim area or other collection point to be picked up (be associated with) 130 by the passenger. The passenger exits the conveyance and is tracked 126 as he moves to the baggage claim area to pick up (be associated with) 130 his baggage. If the passenger's check smart tag matches 150 the object smart tag(s) of the baggage the passenger is removing from the baggage claim area, an exit gate may be opened 160. If there is no match, an alarm may sound and/or a security guard alerted.

Information stored in the memory of the smart tag in a travel environment may include, for example, a smart tag serial number (which may be permanent or changeable), a unique identifier relating all related smart tags, passenger identification, bag identification, flight/train/ship number, time and date, origin and/or destination, check-in station, check-in agent, tracking station identity, date and time of passing each tracking station, and any other useful information. It is noted that the invention may find similar application in a transport environment wherein baggage and/or packages are checked in at a shipping origin and returned or delivered to a recipient at a receiving destination, for example, shipment by airplane, by train, by ship, by truck, and/or by any other conveyance.

Considering FIG. 1 in the environment of a medical facility, such as a hospital and/or pharmacy, for example, wherein medication, supplies and implements are issued 100 for a particular patient, procedure or use: Dual smart tags are issued 100 for each procedure, treatment or medication ordered. One smart tag, an object smart tag, is issued 100 for each medication, implement procedure and treatment and is affixed to the container therefor in the pharmacy, the implement to be utilized or the facility, such as the surgical operating room, diagnostic machine and the like, to be utilized. Where the medication or implement, for example, has plural units packed or contained in a larger unit or container, object smart tags are issued and affixed to each of the plural units.

The object smart tag is encoded to contain, for example, a serial number or other smart tag identifier, the identity of the medication, quantity and dosage, manufacturer and/or provider, expiration date, and the identity and particulars of the implement, procedure and/or treatment with which the object smart tag is associated or affixed. A paper label containing the same information as is stored in the object smart tag may also be issued and affixed to or associated with the medication, implement, procedure and/or treatment.

When a doctor, physician or other personnel writes a prescription, referral, script or other order for medication, a procedure or treatment, he utilizes a device that issues a check smart tag that is affixed to an otherwise conventional paper document. Encoded in the check smart tag is information such as, for example, a serial number or other smart tag identifier, the identity of the medication, implement, procedure and/or treatment, dosage, form and frequency of administration information, refill and repetition information, issue and/or expiration dates, the patient's name and other patient information, the name of the physician or other person writing the order, and/or the diagnosis or sickness or condition. The paper document preferably contains the same information in human-readable form.

The medication, implement, procedure and/or treatment with the object smart tag associated or affixed is transported 114 over transport path 110 to the destination, i.e. the point at which the medication, implement, procedure and/or treatment associated with the object smart tag is administered or used. Along transport path 110, the object smart tag is read and tracked 112, 116. The patient and order with check smart tag affixed is transported 124 over transport path 120 to the destination, i.e. the point at which the medication, implement, procedure and/or treatment associated with the check smart tag is administered or used. Along transport path 120, the check smart tag is read and tracked 122, 126.

At the destination, the patient and his check smart tag are associated 130 with the medication, implement, procedure and/or treatment and its object smart tag, and both object and cheek smart tags are read 140 and compared 150 to determine whether they match. If there is a match 150 ("Y"), then the proper medication, implement, procedure and/or treatment is present for that patient as ordered, and the administration or conduct thereof may proceed 160. If there is no match 150 ("N"), an alarm 180 is given and the patient is not administered the unordered or otherwise incorrect medication, procedure and/or treatment is not administered, and the wrong implement is not utilized.

In the case of no match 150 ("N"), a search 190 may be conducted to identify and associate with the patient the proper medication, implement, procedure and/or treatment, all of which are tracked in a relational database. Alternatively and/or additionally, search 190 may be conducted for each reading 140 of the object and check smart tags for associating related information from the relational database. Such additional information may include, for example, the patient's other medical conditions and medications, medical conditions, allergies and reactions, drug interactions, the effectiveness of the prescribed medication or treatment for the indicated illness, disease or condition, and the like, and is utilized to alarm or alert 180 personnel as to any actual or potential problem or adverse effect.

It is noted that the transport paths 110, 120 may be entirely or partially within a given facility, such as a pharmacy. In such case, the pharmacist receives the prescription with the check smart tag affixed and a tag reader reads 112 the information therein to provide a "pick-list" of the medications and implements ordered, and can print the prescription labels therefor. The medication or implement filling the prescription has an object smart tag affixed thereto is associated 130 with the prescription having a check smart tag affixed thereto, and is dispensed through a window or "tunnel" that includes an antenna array and smart tag reader for reading 140 both the object and check smart tags and comparing 150 same for a match, as described. At this time, the pharmacist is alerted to any error or problem determined from the comparing 150 and/or from searching 190 the relational data base and/or medical information database. On the other hand, parts of transport paths 110, 120 may also be in different facilities and locations.

For example, where the disease or condition is encoded in the check smart tag, and the relational database includes or is linked to a medical information database that includes medication, treatment and effectiveness information, then medical personnel are provided an indication of whether the prescribe is a functionally useful treatment such as a specific medication, or is useful as a supplement such as a vitamin or mineral or herb, or is functionally neutral or is functionally adverse or contraindicated. Such databases of medications and/or treatments are available and may be linked to the relational database utilized for searching 190 object and check smart tag records. One such database is available from eProcrates located in San Diego, Calif.

A significant advantage of such arrangement is the reduction of mis-prescribing and inappropriate and/or unnecessary treatment, or other human-errors due to an alarm or alert being provided. Likewise, drug interactions, adverse reactions and allergies are avoided. It is noted that such medical relational database can be coupled to the smart tag issuing 100 so that the physician or other person ordering medication or treatment is alerted to any potential problems at an early time.

In addition, at reading 140 just prior to dispensing 160, the patient information from the check smart tag may be written 140 to the object smart tag on the medication or implement, and the object smart tag may thereafter be utilized with another smart tag reader described below to provide, for example, patient warnings and reminders, either visually or audibly, for alerting the patient to take the medication and/or to have a prescription refilled.

Thus it is evident that the same system elements may be configured to provide a system in accordance with the invention in any one of many types of environments, facilities, locations, functions and operations.

Figure 2:
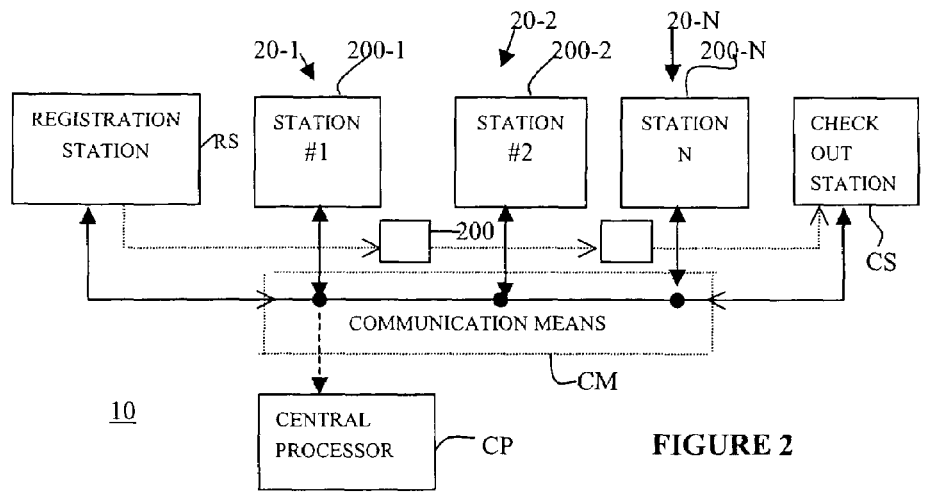
FIG. 2 is a schematic block diagram illustrating an example of a system including plural stations according to the present invention.

FIG. 2 is a schematic block diagram illustrating an example of a system 10 including plural stations 20-2, 20-2, ... 20-N in accordance with the invention. Check in and registration station RS is for receiving information relating to the object to be tracked and the check object, and coding that information into the memory of plural smart tags 200 that are issued accompany the tracked object and the check object. Typically, smart tags 200 are issued as part of an identification label or claim check displaying the pertinent information in human readable form. Station RS is monitored by processor CP and communicates the information stored in smart tags 200 thereto, and may be under the control of processor CP. Similarly, stations 20-1–20-N and check-out station CS also communicate with and may be controlled by processor CP.

Because the object smart tags and check smart tags are the same functionally except for the information stored therein, and the various stations (electronic gates) are the same functionally, the system operates with both object and check smart tags in the same manner, i.e. reading and writing data from and to the smart tags 200 at each tracking station 20-1–20-N that the particular tags pass. Thus, FIG. 2 illustrates a smart tag 200 traveling over transport path TP which can be either an object smart tag or a check smart tag.

As the issued object smart tag 200 attached to the tracked object moves over its transport path TP past ones of the various tracking stations 20-1 through 20-N, object smart tag 200 is read by the respective electronic gate at each station 20 passed. The information so read from the object smart tag 200 may be stored in a memory of the electronic gate of station 20 and/or may be communicated to a central computer or processor CP via any suitable communication link. Information relating to the object and object smart tag 200 passing each tracking station 20, such as the identity of the station and the date and time of passing, is either stored in (written to the memory of) object smart tag 200 and/or is stored in the electronic gate and/or is communicated to the central computer CP, for later retrieval and use.

Separately, as the issued check smart tag 200 attached to the object moves over its transport path TP past ones of the various tracking stations 20-1 through 20-N, check smart tag 200 is read by the respective electronic gate at each station 20 passed. The information so read from the check smart tag 200 may be stored in a memory of the electronic gate of station 20 and/or may be communicated to a central computer or processor CP via any suitable communication link. Information relating to the check and check smart tag 200 passing each tracking station 20, such as the identity of the station and the date and time of passing, is either stored in (written to the memory of) check smart tag 200 and/or is stored in the electronic gate and/or is communicated to the central computer CP, for later retrieval and use.

When the object and object smart tag 200 has completed its travel over its transport path TP to reach the destination, having passed those of tracking stations 20-1 through 20-N that are along transport path TP, it becomes associated with the check and check smart tag 200. Check and check smart tag 200 has completed its travel over its transport path TP to reach the destination, having passed those of tracking stations 20-1 through 20-N that are along its transport path TP. Check out station CS then reads the object smart tag 200 and the check smart tag 200 and compares the information therefrom for a match to indicate that the proper object and check have been associated at the destination.

Where an object and check do not become properly associated at a destination, one or the other is at the wrong destination, and a search can be conducted by processor CP relating the records of the relational database therein pertaining to the particular object smart tag 200 or check smart tag 200 that is at the destination. Because both object and check smart tags 200 are preferably tracked and tracking information is stored in the relational database of processor CP, the whereabouts and travel of either or both may be quickly ascertained. If desired check out station CS may provide a tangible record of such information to any desire degree of detail. For example, a simple form of such tangible record may include the missing object's or missing check's identification and a list of tracking stations by which it passed. A more comprehensive form of the tangible record may include the object's identification, a list of the tracking stations passed, a list of the dates and times thereof, information about the object, its owner, the shipper or recipient, and any other data stored in the relational database of processor CP.

Moreover, such tangible record may be any one or more of a printed document, a computer floppy disk, a computer CD-ROM disk, or any other desired medium. Where the tangible record is a computer readable medium, such as a floppy disk or a CD-ROM disk, the medium, the computer readable files thereon may include files directing access to either a central web site or to particular web sites at which further information may be accessed and/or retrieved. Such record may be provided to personnel seeking to find and match up the missing object or check or to the owner, shipper or recipient thereof, or other person, as may be desirable and appropriate.

While only one processor (computer) is necessary to the system 10, it is often convenient to employ a network of processors (computers) in which plural de-centralized processors are linked, as by a network, for example, to a central processor CP. Typically, each local processor is associated with one or more stations 20 for monitoring the operation thereof and/or for controlling such station(s) 20, and is linked with the central processor CP for communicating monitoring information therewith and/or for communicating control and/or programming information therewith. Thus, stations 20 may operate independently, under the control of local computer, under control of central computer CP, or some combination thereof.

Communication between the registration station RS, the various tracking stations 20-1 through 20-N, checkout station CS and (local processors and) central processor CP may be via any suitable communication means CM including but not limited to wire, cable, optical fiber, local area network (LAN), wide area network (WAN), radio (RF) transmission, optical transmission or other suitable means, or any combination thereof, with or without one or more communication hubs. Such communication may be in real time, be periodic or aperiodic, and may include one or more communications, and may utilize any suitable format or protocol, such as the RS485 and/or RS232 standards.

Communication may occur periodically, but promptly (e.g., within seconds or minutes) relative to the speed and frequency of passing of the objects in transport and the time and date thereof, and the timeliness of tracking and monitoring desired. Communication may be periodic, but less frequent, regarding the status of a station 20. Periodic communication may be beneficial for wireless communication to reduce frequency spectrum and bandwidth requirements, and communication units may be placed at higher locations and unobstructed positions, such as in a tall building, or other suitable location for proper communication.

Suitable communication devices are available commercially from several sources and provide direct communication or communication via relay links. Such devices are suitable for communication between computers over local area and wide area networks and may employ CDMA and/or spread spectrum communication techniques. For example, RF communication devices available from Proxim, Inc., located in Sunnyvale, Calif., include, for example, a RangeLAN2 system operating at 2.4 GHZ, a Stratum Building-to-Building system, and a Symphony Home and Small Office system. Such devices transmit and receive information and programming changes between and among central processor CP and local computers and/or control units 40 equipped with a compatible communication device.

Where information is written to and stored in smart tag 200 at each of tracking stations 20-1 through 20-N, communication may be by check out station CS reading the information so stored in smart tag 200. Smart tag 200 may be collected by check out station CS, thereby permitting reuse of the smart tags 200.

Figure 3:
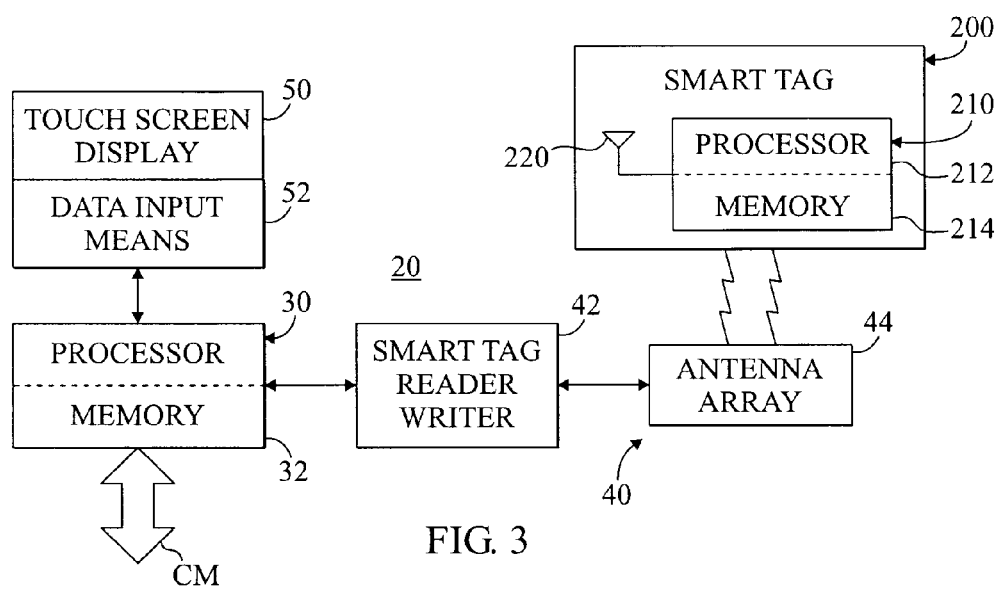
FIG. 3 is a schematic block diagram of an example of a tracking station useful in the system of FIG. 2 according to the invention.

FIG. 3 is a schematic block diagram of an example of a tracking station 20 useful in the system of FIG. 2 according to the invention. Station 20 includes an electronic gate 40 and a processor 30 for communicating with smart tag 200, which may be an object smart tag or a check smart tag. Processor 30 is coupled to electronic gate 40 which includes a smart tag reader and/or writer 42 for at least receiving and decoding information from a smart tag 200 that is within its detection region. Processor 30 includes one or more memory devices for storing information relating to station 20, date and time, and the like, and for storing information read from a smart tag 200 or entered via optional data input means 52. Information from memory 32 is produced and communicated to smart tag 200 and/or to another processor via communication means CM.

Preferably, smart tag reader 42 receives information transmitted by smart tag 200 via an antenna or array of antenna 44, i.e. when smart tag 200 is within a space in which electromagnetic radiation from its antenna 220 is effective to be received by antenna array 44 of the smart tag reader 42. In addition, and preferably, the smart tag reader 42 is a smart tag reader/writer 42 that also encodes and transmits information electromagnetically via its antenna array 44 effective to be received by antenna 220 of smart tag 200 when in the detection region. Such smart tag readers and reader/writer 42 may be of any suitable type, including commercially available conventional reader/writers.

As described herein, the antenna of the all-orientation antenna arrays 44 are preferably either spatially separated or temporally separated by being activated sequentially in time to eliminate interference, and a single reader/writer unit 42 therefor may control and operate a plurality of all-orientation antenna arrays 44. It is noted that the use of an antenna array 44 that has the ability to detect smart tags 200 in its detection region with substantially 100% reading rate, as is the case for the all-orientation antenna array 44, is important to obtain full the advantage of the present invention. Typically, substantially 100% reading rate means at least a reading rate of about 99%, and preferably a reading rate of about 99.5%, irrespective of the orientation of the smart tag within the detection region of the antenna array. It is noted that variations in the antenna and/or smart tags and/or reader/writer units, such as variations due to component, production, adjustment, tuning, matching and other tolerances, and variation over time and temperature, as well as any other sources of electromagnetic radiation incident on the antenna, may produce variation of those percentages.

Smart tag 200 includes an electronic device 210 and an antenna 220 by which information is provided and/or received. Electronic device 210 typically includes an electronic memory 214 in which information is stored and a processor 212. Processor 212 retrieves and codes information produced from memory 214 in a form suitable for communication via antenna 220 and/or electrical contacts 222. Preferably, processor 210 also codes and provides information received via antenna 220 and/or electrical contacts 222 and stores such information in memory 214.

The coding provided by processor 210 may include modulating and demodulating signals for radio frequency communication and/or converting information to suitable digital and/or analog signal format for communication via antenna 220, and may also include converting received information to a form, typical a digital format, for storage in memory 214. Processor 210 may also perform signal synchronization, authorization verification and/or encryption/decryption as may be deemed necessary and/or convenient.

Information including related information from smart tag 200 and from electronic gate 40, e.g., typically information that is a record of an object passing station 20 or plural stations 20. Such information may be produced from memory 32 of processor 30 or from memory 214 of smart tag 200, or both.

Optionally, electronic gate 20 may also include a display 50 and a data input means 52 coupled to processor 30 and to reader/writer 40 for communicating with a smart tag 200. Display 50 typically includes a visual display device such as a video or computer monitor, LCD display, cathode ray tube, dot-matrix display, touch screen display, or any other display providing information in a visual form that can be perceived (e.g., seen) by a person. Display 50 may also include an annunciator, loudspeaker, or other sound transducer for providing audible information that can be perceived (e.g., heard) by a person. Data input means 52 typically includes a keypad, keyboard, touch pad, light pen, or other device by which a person may enter information into electronic gate 20.

Display 50 and data input 52 may be used, for example, to monitor the objects passing or that have passed station 20 and/or for entering information to be stored in the smart tag of an object passing station 20, such as information indicating that the object has been manually inspected or otherwise received or should receive special handling or attention. Examples in the travel environment include, for example, baggage inspection, searching for lost baggage, hand searches, chemical sniffing by machine or dog, questioning or interrogation of a passenger, and the like.

Personnel may enter information requests and the like, i.e. requests for data items or specific records, via input means 52 which information is stored in a memory 32 associated with processor 30 or is transmitted to smart tag 200 via reader writer 40. In either case, information from smart tag 200 and information entered via input means 52 are related and stored in a memory, and typically provide a record of activity relating to station 20. The memory in which such information is stored may be memory 214 of smart tag 200, or may be memory 32 of gate 20, or both.

Also optionally, a printer to paper, or an electronic writing device that provides the information on other tangible media, such as floppy disks, CDs and other electronic media, may be associated with a particular station 20 or with a check-in or check-out station, either on a temporary or permanent basis. Such printer may be remote from a particular station 20 with information communicated thereto by conventional communication means including but not limited to wire, cable, optical fiber, local area network (LAN), wide area network (WAN), radio transmission, optical transmission or other suitable means, or any combination thereof, with or without one or more communication hubs.

Alternatively, display 50 may be a touch screen display 50 that provides an easy to use and convenient combined display 50 and input means 52 through which information may be provided and information and requests may be received. Input means 52, which may be optional in this embodiment, such as a standard computer keyboard, provides an alternative input means through which information may be entered into processor 30.

Smart tags 200 are typically utilized for tagging and electronically identifying articles by reading information stored in the electronic memory of the smart tag using contact-less radio-frequency (RF) transmissions. Available smart tags operate at RF frequencies between hundreds of kilo-Hertz (KHz) and several giga-Hertz (GHz). Typical frequencies for RF smart tags and smart cards (functionally the same but different in form) include 125 KHz, 13.56 MHZ, 915 MHZ and 2.45 GHz.

For the present smart tagging system and method, an electronic integrated circuit in the form of a semiconductor chip is connected to an antenna ANT on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

Suitable smart card/smart tag semiconductor chips include the I-CODE chip and the MIFARE chip, both available from Philips Semiconductors located in Eindhoven, The Netherlands, and the types SLE4442 or SLE4428 memory ICs available from Siemens of Germany. Also suitable are the "Tag-it" devices available from Texas Instruments of Dallas, Tex., the "Pico-Tag" devices available from Inside Technology of France, and devices available from Microchips of Phoenix, Ariz. Each smart tag/semiconductor chip must have sufficient memory for storing all of the information desired to be stored therein. Typically about 100–500 bytes is sufficient and one kilobyte is preferred.

Suitable smart tag reader/writers include those utilized with the LEADS-TRAKKER™ system available from Avante International Technology, Inc. located in Princeton, N.J., the Fast-Track system available from Escort Memory Systems located in California, the Interrogator Control Module available from Samsys Technologies, Inc. located in California, and the Memor 2000 RFID available from Minec company located in Taby, Sweden, as well as readers/writers available from Intermec Technologies Corporation located in Everett, Wash., Fargo Electronics, Inc. located in Eden Prairie, Minn., or from Atlantek, Inc. located in Wakefield, R.I., or from Avante International Technology located in Princeton, N.J.

Suitable processors (both local processor LC and central processor 200) include any modern personal computer (PC), such as those having a Pentium®, Celeron®, or similar processor, running a Windows, Unix or other PC operating system. Where a LAN or WAN network is employed, standard PC networking hardware and software may be included in the PCs. Desirably, the processors, as well as the smart tag control units readers/writers, will have redundant memory and information storage, such as by one or more of non-volatile memory, a hard disk drive, a floppy disk drive, a CD-write drive and the like.

Applications programs suitable for recording and manipulating the information include relational database software such as the Windows-NT-based Microsoft ACCESS database as well as ORACLE, SYBASE and INFORMIX database software, and software languages such as Visual Basic, Java, or other language compliant with American National Standards Institute (ANSI) Standard 256. Each database record will typically include fields some or all of the following information: The article identification and/or serial number and/or quantity, station and/or operation identification, entry and exit time data (arriving and leaving), date, bill of material data, actual/planned material usage, keypad/keyboard entered data, component/part/material smart tag information, operator/employee/individual smart tag information, quality control and inspection data, transport provider, and the like. Thus, the database maintains an inventory of the articles, their quantities and locations and may be utilized to categorize the data contained in the database records for tracking any article or any type or group of articles, and/or any station so also provide status and inventory by station, operator or any other desired category of the stored records. Typically, the database software interfaces with other standard software, such as the standard MRPII software available from the Great Plains division of Microsoft Corporation of Redmond, Wash.

Desirably, processed information and/or transactional information should be available in human readable form, such as by display on a computer monitor or by print out by a computer printer, both of which may be conventional. Where certain information recorded and/or processed is representative of parameters or conditions that may pose a hazard to personnel or property, or are critical to an operation or process, or indicate a failure of some test or condition, it is desirable to include an alarm, such as a loudspeaker, flashing light, buzzer or the like, that is activated automatically by an out-of-limit or marginal condition.

Figure 4A:
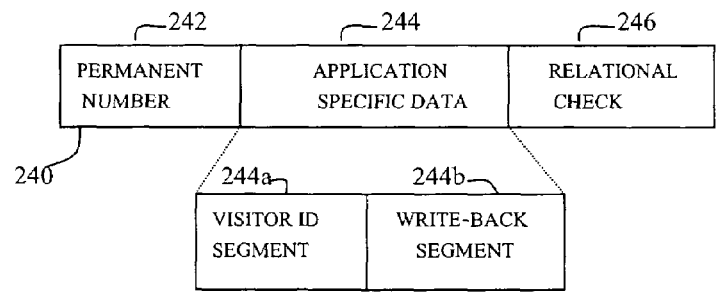
FIGS. 4A, 4B and 4C are schematic representations of memory allocations and relational database arrangements suitable for use with the invention.

FIG. 4A is a schematic representation of a memory allocation 240 suitable for a smart card 200 for use with the invention. Sections 242, 244, 246 of memory EM of smart tag ST are allocated or segmented for the storage of particular information. Typically, an EEPROM memory is utilized.

Manufacturers of the electronic devices or chips utilized in smart tags typically segment the memory thereof into two segments: a first segment 242 into which the manufacturer burns in (i.e. permanently stores in a way that the information cannot thereafter be changed) a unique identifier of the electronic device or chip. Such permanent number 242 may be tens or hundreds of bits in length, as is appropriate for providing a unique identifier. The remainder of the memory capacity 244, 246 is left available for the storing of data therein in use, which data may be modified, written over or otherwise changed in the use of the electronic device.

Smart tags 200 are typically utilized for tagging and electronically identifying objects by reading information stored in the electronic memory of the smart tag using contact-less radio-frequency (RF) transmissions. For the present smart tagging system and method, an electronic integrated circuit in the form of a semiconductor chip is connected to an antenna on a substrate to serve as a tag. The semiconductor chip typically includes a processor and an electronic memory for storing information. Information stored in a smart tag can be read by a suitable smart tag reader and can be read and written to by a suitable reader/writer. The reader or reader/writer and the tag antenna are tuned suitably so that RF energy (electromagnetic fields and electrical signals) can stimulate the tag to emit a signal representative of the information (electronic codes or data) stored in the tag memory. Such contact-less RF tags eliminate the need for an electrical contact or a line-of-sight path for communication with the smart tag.

While it is satisfactory to utilize only the stored permanent number identifier 242 to identify the smart tag containing the electronic device, it is preferred that the permanent number 242 be stored in a relational database in a processor and be linked to other identifying or use information for use in identifying the object or article to which the smart tag is attached or with which it is associated. Such processor is in communication with the smart tag readers that read information from memory 240 of the smart tags.

One potential problem associated with such smart tags occurs where the information desire to be stored therein is simply coded and written into the writeable memory 244, 246. In that case, any change to the information stored therein is undetectable. Typical sources of erroneous or corrupted or erased data include electromagnetic interference, whether accidental or intentional, as well as any intentional or unintentional attempt to modify the stored information, whether authorized or unauthorized, such as by a thief or counterfeiter. Having other than the correct data stored in the memory of the smart tag can lead to misdirection, loss or damage to property and/or injury to person, none of which is desirable or acceptable.

To reduce the likelihood of undetected erroneous stored information, the remaining memory 244, 246 available to the smart tag user is further segmented into two segments. The first segment 244, which is typically of greater memory capacity, is allocated for the storage of application specific data, such as the article identification, manufacturer, batch or lot identification and other information, 244a, and for information 244b that is written back to the smart tag memory by the smart tag reader/writer at the various stations, such as station identification, operation performed, date and time, and the like. The second and smaller memory segment 246 is allocated for storing a relational check number or code that is a calculated or coded value representative of at least the value of the stored application specific data, and preferably representative of the value of both the permanent number and the application specific data. Herein, the relational check number or code is usually referred to simply as the relational check number to include numbers and/or codes.

Where the smart tag includes processing capability, the processor can be programmed to calculate the relational check number upon each time data is written to its memory, preferably upon command to do so. Alternatively or additionally, each reader/writer or an associated processor or central processor can calculate the relational check number. Because the electronic device utilized in a smart tag has substantial memory capacity, the relational check number can include many bits and so can be constructed to permit error correction as well as error detection.

The foregoing arrangement permits detection of errors and/or changes to the application specific data at any time by reading the card and recalculating the relational check number which is then compared to the relational check number read from the smart tag. If the read and calculated relational check numbers match, then there is a high degree of certainty that the application specific data has not been changed and does not include errors.

It is noted that while the permanent number, the application specific data and the relational check number or code are referred to as "numbers," each may include numerical, alphabetic, alpha-numeric and other characters and symbols, conventional or arbitrary, as may be desired. The relational check number or code is representative of the information stored in the memory in accordance with a predetermined formula or algorithm or other scheme, either on a character by character basis or on the basis of one or more combinations of the characters or values stored in the memory. Suitable formula and algorithms include, for example, parity checks or other parity representations, sum checks, field relationship checks or any other predetermined relationship between the stored permanent number and application specific data values and the relational check number.

Thus, any change to the stored information, including a change that changes the stored value of the relational check number or code, will be detectable and an indication that the stored data contains one or more errors or changes. Typically, the particular formula or algorithm that generates the relational check number is not known to third parties and is not derivable from the data stored in the smart tag memory, and so the relational check number provides a degree of security for the information stored in the smart tags.

The formula or other algorithm or other encoder for generating the relational check code or number may be provided in protected firmware, in software or in a combination of firmware and software, to provide a higher level of security against deciphering or unauthorized coding. For additional security, each encoder may also include a unique identifier that must be paired with coding software having the same unique identifier for enabling proper functioning. The unique encoder identifier may also be included in or as part of the application specific data.

Figure 4B:
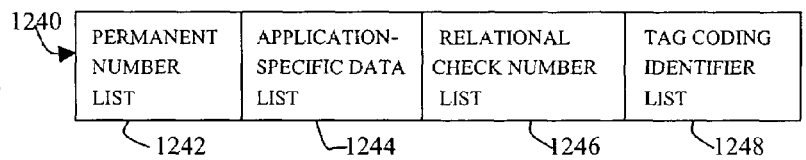
Figure 4C:
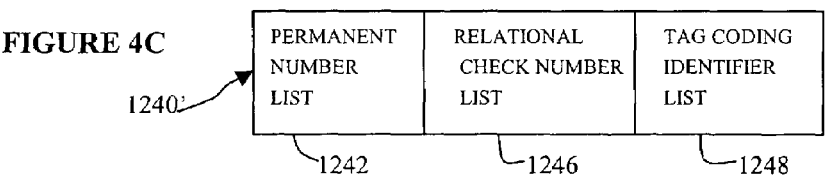

FIGS. 4B and 4C are schematic representations of memory allocations of a relational database of a processor suitable for use with the invention. Database 1240 represents an aggregation of records stored in relational database computer software running on a processor. Compiling records of data written to smart tags in a relational database is particularly advantageous where the data is written to the smart tag and where it is important to be able to retrieve such data should the smart tag be misplaced, lost or stolen, or if the information stored therein is changed or corrupted or lost for any reason.

In a complete database, database 1240 illustrated by FIG. 4A stores a record each time data is written to any smart tag used with the tracking system. Database 1240 includes, for example, a number of data fields comprising a list 1242 of the permanent numbers of the smart tags, a list 1244 of the application specific data of each writing of application specific data to each smart tag, a list 1246 of the relational check number written to each smart tag with each writing of application specific data thereto, and a list 1248 of tag coding identifiers such as the date, time, reader/writer identification for each writing of application specific data to each smart tag. Lists 1242, 1244, 1246, 1248 are comprised of aggregations of records corresponding to each writing of information to each smart tag, and may be provided from one or both of the smart tag and the reader/writer utilized for each writing of information.

In a simplified database, database 1240' includes, for example, lists 1242, 1246 and 1248. This database arrangement may be advantageous where the database is stored in a local processor and/or a smart tag reader/writer where available memory capacity may be more limited than in another processor. In either a complete or simplified database, information relating to each writing of information to each smart tag is communicated to a processor in real time or delayed, and may be periodic or aperiodic. Information may be communicated by any of the means described as well as by manual communication, e.g., by transporting the smart tag reader/writer and/or local processor and/or computer media containing the information stored in such smart tag reader/writer and/or local processor to another processor.

Suitable relational database software include ACCESS and SQL Server database software which runs on conventional PC processors with standard operating systems, such as Windows-NT, both available from Microsoft Corporation of Redmond, Wash., as well as the ORACLE, SYBASE and INFORMIX database software. Preferably the database software is "Internet-ready" in that it includes features facilitating connection to and communication of information via the Internet.

Each database record will typically include fields for some or all of the following application specific data or information in addition to the permanent number:

Object information including but not limited to the identification of the object, its owner, its shipper or its recipient, the identification of the mode of, time of and carrier of transport, batch, lot or shipment number and/or other identifying number, and the like.

Station information including but not limited to station identification, operator/personnel identification, entry and exit time data (arriving and leaving), date, expiration date, keypad/keyboard entered data, smart tag information, quality control/inspection information, and the like.

Relational check number representative of any or all of the foregoing application specific data and/or the permanent number of the smart tag.

Where the information written to each smart tag is all communicated to and stored in a central database and where all subsequent action to be taken will be taken based upon the information stored in the central database, then the use of a relational check number to verify the information stored in the smart tag and/or detect errors in and changes thereto is of much less importance.

In any case, the central database can be utilized to provide particular information, general information, status information, statistical information, and other information on an on-line basis that is at least as current as the entry of record information into the database. Where every writing of information to a smart tag is also replicated in a record stored in the relational database, the relational database contains and can provide a detailed history of the utilization of the smart tag, e.g., the path of the object's movement and the date and time of its passing each station as well as information entered at each such station.

Figure 5A:
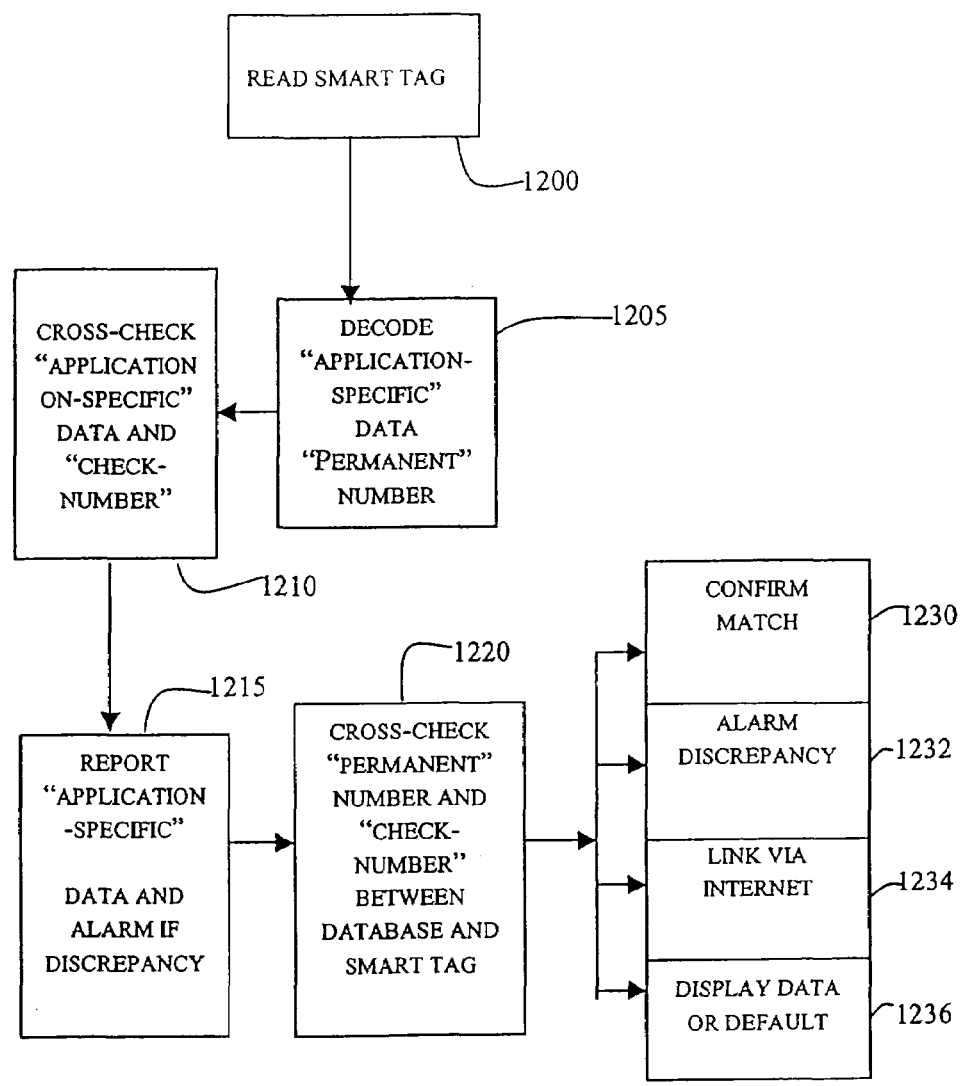
FIGS. 5A and 5B are flow chart schematic diagrams illustrating examples of a utilization of the memory allocations and relational database arrangements of FIGS. 4A–4C according to the invention.

FIG. 5A is a flow chart schematic diagram of an example of a utilization of the memory allocations 242, 244, 246, and of memory allocations and relational database structures 1242, 1244, 1246, 1248 of FIGS. 4A–4C according to the invention. Information from the smart tag is read 1200, such information including, for example, a permanent number related to the particular smart tag, application specific data relating to the article and stations, and a check number representative of at least the application specific data and preferably the application specific data and the permanent number. Application specific data read from the smart tag is decoded 1205 and the permanent number read from the smart tag is stored.

A cross check 1210 is made between the application specific data and the permanent number read from the smart tag. Cross check 1210 includes calculating from the application specific data and the permanent number the value of the check number and comparing that calculated value to the value of the check number read from the smart tag. If the two check numbers correlate, then there is a high degree of confidence that the application specific data does not contain errors and has not been altered. It is noted that cross check 1210 is performed at least initially using only the information read from the smart tag and so does not necessarily require a central processor or database. If there is a non-correlation or other discrepancy, such non-correlation or discrepancy produces an alarm 1215 and further correlation steps may be taken.

Results of the reading of smart tags and of the correlation of the check numbers thereof are reported 1215 in any convenient form. Such reporting may be by aggregation of records in a database for current or delayed review, by displaying the results or summaries of results or statistics related to results on a human-perceivable display, or by initiating an alarm or alert 1215 of lack of correlation of check numbers. Such alarm may take the form of a print out, a paper document, a visual display, a warning screen, an audible signal, a signal to a control or monitoring station or to a pager or cell phone, or any other convenient form of alarm, alert or signal.

A further cross check 1220 may be made to check at least the permanent number and relational check number stored in the database to the permanent number and relational check number read from the smart tag. Because the permanent number of a smart tag cannot be changed, cross check 1220 includes comparing the relational check number read from a particular smart tag having a given permanent number with the relational check number stored in the relational database for the most-recent record corresponding to that given permanent number. Correspondence or lack of correspondence of the respective relational check numbers from cross check 1220 is utilized to confirm such correspondence or lack thereof by human-perceivable display or alarm or alert, as described above.

In particular, correspondence in cross check 1220 initiates confirming a match 1230, e.g., by any human-perceivable display, report or alarm, as described above. Lack of correspondence in cross check 1220 is a discrepancy that initiates giving an alarm 1232, e.g., by any human-perceivable display, report or alarm, as described above.

Initiating a human-perceivable display or alarm, or communicating information to or from another location can include linking 1234 the processor performing any of cross checks 1210 and 1230 and/or producing a report or alarm 1215, 1230, 1232, to a remote processor, display or alarm via the Internet. Such linking via the Internet 1232 may include accessing a remote relational database, which may be an open database to which information can be added, deleted or changed or which may be a closed database not allowing information to be added, deleted or changed via the Internet link. Access may be controlled by access codes, passwords and the like as desired, and information communicated via the Internet may be encrypted, to provide the desired degree of security.

Further, correlation or lack of correlation or any other difference between the information read from a smart tag and the related information stored in the relational database initiates displaying 1236 data from any one or more of the smart tag and a local or central relational database, or if such data is limited or missing, displaying 1236 a default indication, e.g., whatever information is stored in the database. Displaying 1236 may include displaying information from the smart tag and the relational database or may be limited, e.g., to displaying the differences and/or discrepancies of that information, and may be immediate or delayed. Displaying 1236 may be for each cross check 1210, 1220, or may be for any number of cross checks 1210, 1220.

The display of the result or status of any step and/or of the information to which attention is to be drawn may be included in a display of information, e.g., such as by highlighting or coloring the portion of the displayed information to which attention is to be drawn, or by separately displaying the information to which attention is to be drawn. Where information desirable to be displayed is available in the relational database, such information is retrieved and displayed automatically, either locally, remotely or via the Internet, as appropriate. If such information is not so available, a warning or instruction to an operator is provided to instruct the operator to either retrieve the information or to segregate or mark the affected smart tag for special treatment or handling, e.g., such as alerting an attendant or operator at final or check out station when an article associated with that smart tag arrives.

It is noted that the foregoing arrangements and method also can enable the detection of changing or tampering with the information stored in the smart card for the unlikely case where the changing or tampering is done with knowledge of the calculation of the relational check number. In such case, the relational check number is correctly related to the application specific data and/or the permanent number and so the simple cross checking 1210 will not detect the changing or tampering. Because the information written to each smart tag is also stored in the relational database correlated to the smart tag unchangeable permanent number, comparison of the changed or tampered-with information read from a smart card is detectable by cross checking 1220 that read information against the information stored in the relational database.

Where desired, the relational database may be accessed and made available by any convenient means, e.g., by providing same on floppy disk or CD-ROM, optical CD and the like that is easily sent by mail, express and the like, or by making same available via communication means such as wire, cable, optical fiber, LAN, WAN, optical or radio frequency transmission, the Internet and the like.

Figure 5B:
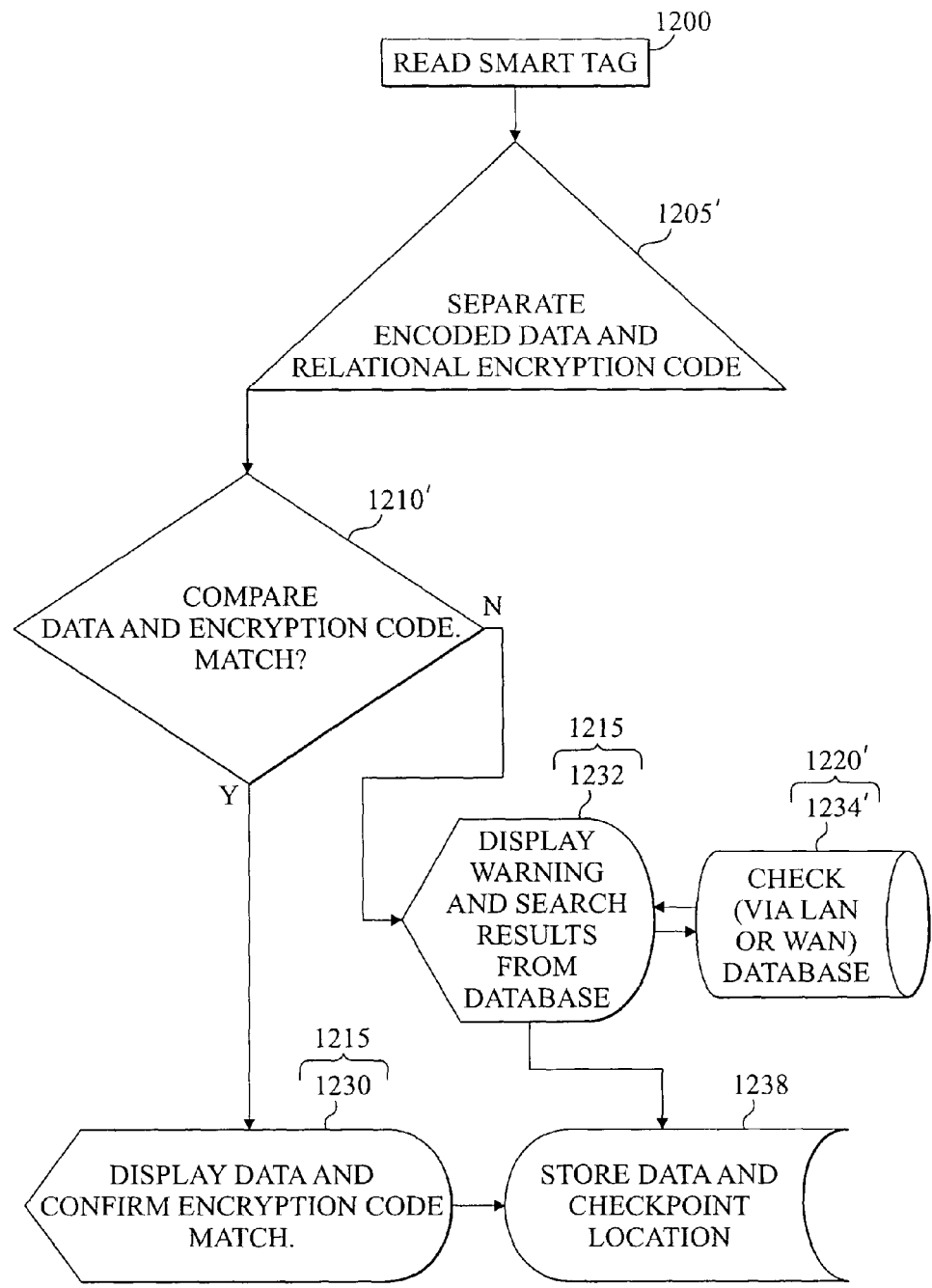

FIG. 5B is a flow chart schematic diagram of another example of a utilization of the memory allocations 242, 244, 246, and of memory allocations and relational database structures 1242, 1244, 1246, 1248 of FIGS. 4A–4C according to the invention. It is noted that the steps of FIG. 5B include steps as described above in relation to FIG. 5A, but arranged for a more direct illustration of certain steps. Information from the smart tag is read 1200, such information including, for example, the permanent number related to the particular smart tag, application specific data, and a relational check number (also referred to as a "relational encryption code") representative of at least the application specific data and preferably the application specific data and the permanent number.

The encoded application specific data and relational check number read from the smart tag are decoded and separated 1205' and are compared 1210' to determine whether the relational encryption or check code or number read from the smart tag corresponds to or matches the relational encryption or check code or number recalculated by the processor from the application specific data and the permanent number read from the smart tag. I.e. match 1210' is a cross check that includes calculating from the application specific data and the permanent number the value of the relational check number and comparing that calculated value to the value of the check number read from the smart tag.

If the two check numbers correlate (i.e. match, path "Y"), then there is a high degree of confidence that the application specific data does not contain errors and has not been altered, and the application specific data is displayed 1215/1230 along with confirmation that the relational check number correlates.

If there is a non-correlation (i.e. non-match, path "N") or other discrepancy, such non-correlation or discrepancy produces the display of a warning or alarm 1215/1232 and initiates further correlation steps. Such further steps include retrieving 1220'/1234' from a relational database records stored therein corresponding the particular smart tag related, for example, by its permanent number, and displaying or posting 1215/1232 such retrieved stored records. Access to the relational database, if not direct in the processor, is by communication 1220'/1234' with a processor via communication means, typically a LAN or WAN, or via the Internet.

Whether there is correlation or non-correlation of the relational check number, a record is stored 1238 in the relational database including the information read from the smart tag in step 1200, whether or not the read data correlated or not in step 1210', and the identity of the station or check point at which such data was read.

Figure 6:
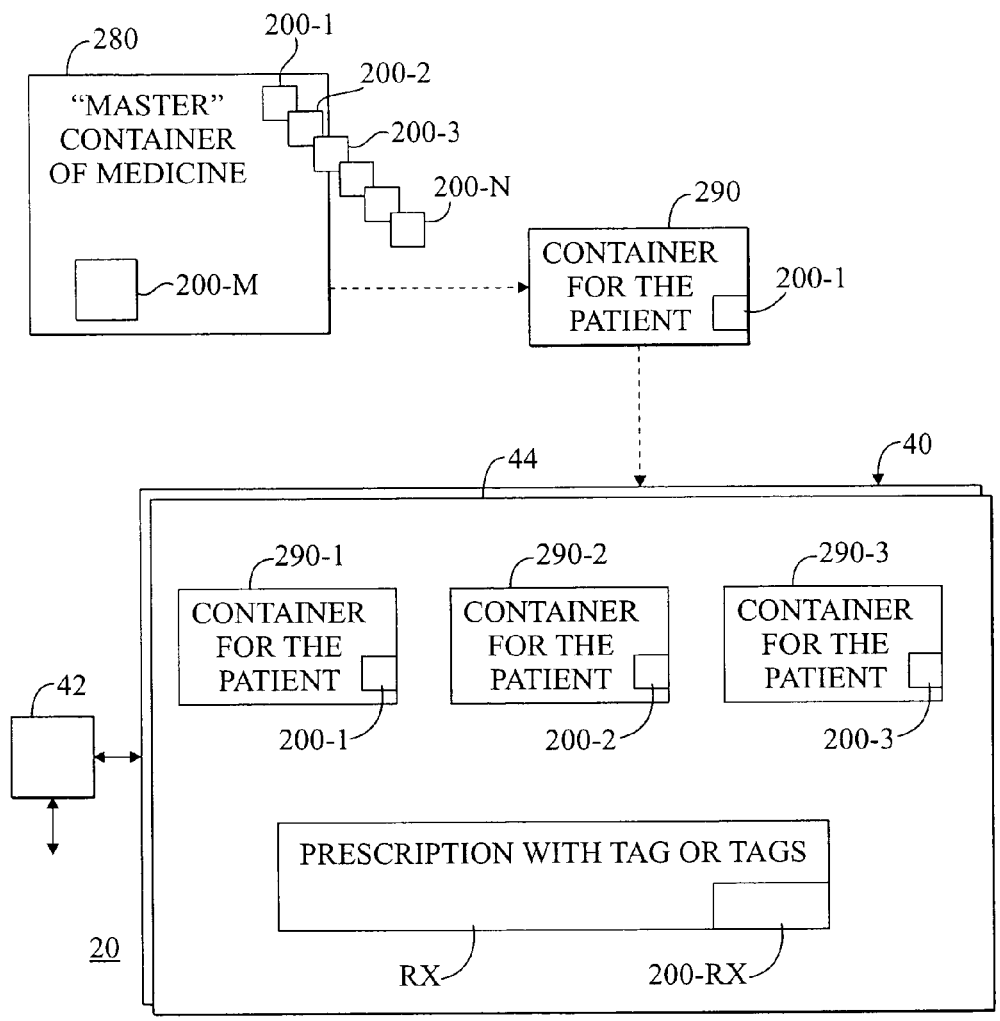
FIG. 6 is a schematic diagram illustrating an arrangement employing smart tags in an environment for processing medicine.

FIG. 6 is a schematic diagram illustrating an arrangement employing smart tags 200 in an environment for processing medicine or medication or medical implements. Herein, medication is used and is deemed to include medication and medicine in whatever form, as well as medical implements, devices and other equipment of any sort, and is representative of any other thing that is to be dispensed or issued in a controlled manner.

Medication is provided, for example, in bulk or quantity in a container referred to as a "master" container 280 that contains plural doses of the medication. Medication may be received in container 280 or be placed into container 280 or be in inventory in container 280, e.g., by a manufacturer, distributor, pharmacy or physician. Doses or units may be "loose" as in the case of a large number of scalpels, syringes, pills or tablets in a bottle, jar, cannister or other container, or may be separately wrapped as in the case of a number of scalpels, syringes or bottles of pills in a box or carton. A master smart tag associated with carton 280 contains information identifying the medication, quantity, dosage, expiration and the like.

In addition, plural smart tags 200-1, 200-2, . . . 200-N are associated with each package or dose. Smart tags 200-1, 200-2, . . . 200-N may be included in master container 280 or may be encoded and issued by the holder of container 280, e.g., by a manufacturer, distributor, pharmacy or physician. As doses/units or dispensing of the medication is ordered, the medication is placed in a dose or unit container 290, e.g., a smaller container for individual use, and one of the smart tags 200-1, 200-2, . . . 200-N is associated with that smaller container 290. Smart tag 200 is at this time encoded to have stored therein patient and treatment information in addition to the medication information as described above. Each smart tag 200 is typically firmly attached or affixed to a respective container 290, e.g., adhesively.

In dispensing or issuing the medication, each individual dose/unit container 290-1–290-3 is placed into or passed through a smart tag tracking station 20. In particular, containers 290-1–200-3 with respective object smart tags 200-1–200-3 attached are placed within the detection region of electronic gate 40 including smart tag reader/writer 42 and antenna array 44 as described. Also placed into or passed through gate 100 is the particular prescription or order Rx having check smart tag 200-Rx therewith.

Reader 42 reads the information stored in smart tags 200-1–200-3 and 200-Rx and cross checks such information to determine whether the medication dispensed as read from smart tags 200-1–200-3 matches the medication ordered as read from smart tag 200-Rx. If they match, then a confirmation is displayed or provided. It is noted that a match indicates that the order has been filled completely as well as accurately. If they do not match, an alert or alarm is provided, all as described above. The result of such cross check may be stored in a relational data base, may be cross checked against other information stored in a relational database, or may be related to patient, allergy, treatment norms or other information stored in a relational database, whether the information is in one database or in plural linked databases.

Figure 7:
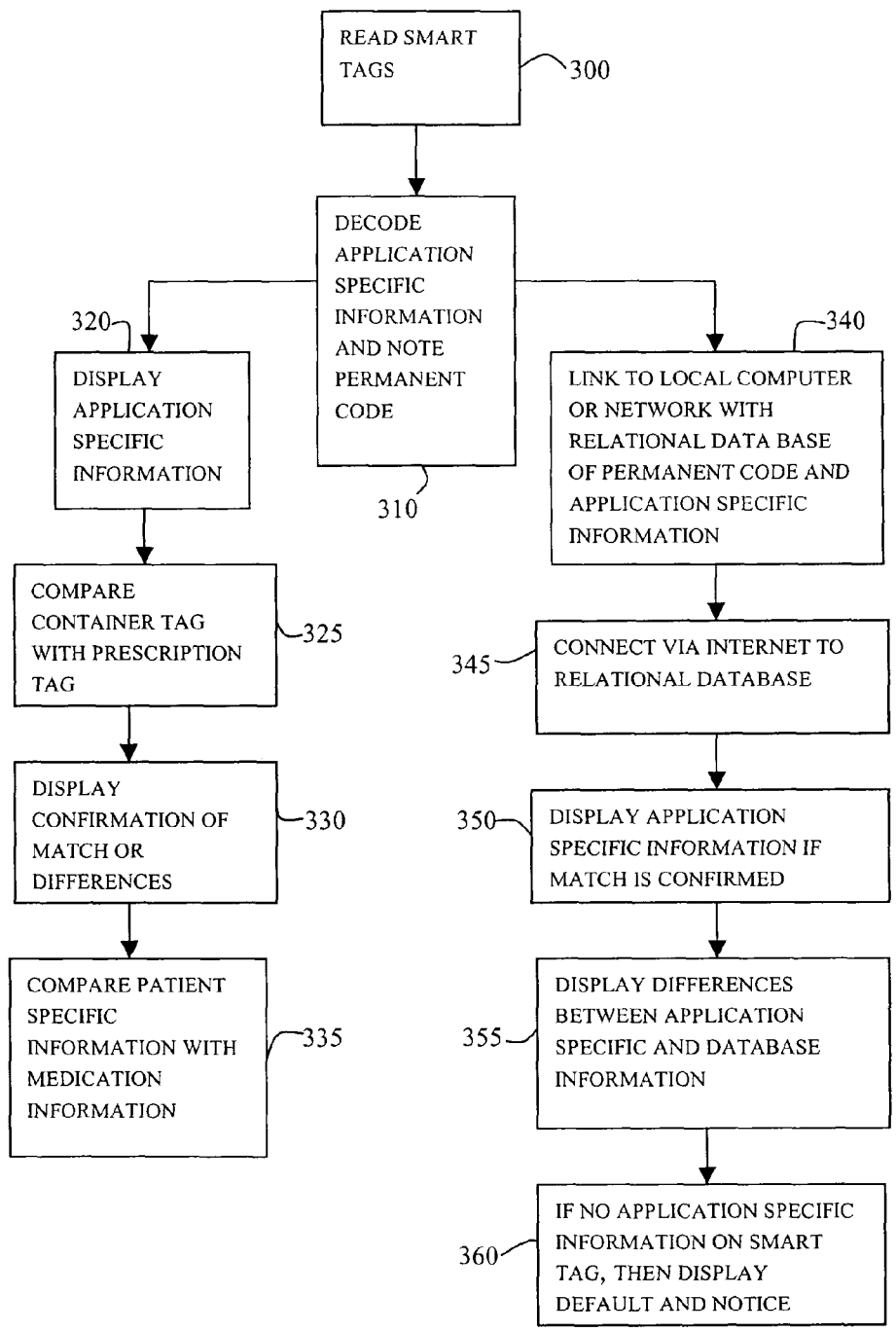
FIGS. 7 and 8 are flow chart schematic diagrams illustrating examples of alternative tracking systems and methods in accordance with the invention in an environment for processing medicine.

FIG. 7 is a flow chart schematic diagram illustrating an example of an alternative tracking system and method in accordance with the invention in an environment for processing medicine. The container (object) and prescription (check) smart tags are read 300 by a smart tag reader, e.g., as in a SMART-TRAKKER™ tracking station from Avante International Technology. The application specific information read is decoded 310 and the permanent number or code identifying the smart tag is read and noted or recorded 310, such data now being available for comparison, cross checking and/or other use.

Application specific information from each container smart tag is displayed 320, e.g., displayed separately (individually) if plural smart tags are present in the smart tag reader, as in a list or manifest. If the prescription smart tag is present, then the application specific information from the prescription tag is also displayed and is compared 325 against that from the container smart tags. Also displayed 330 is a confirmation that the application specific information from the container and prescription smart tags matches or an alert or alarm that such information does not match. In addition, patient specific information read from either smart tag is compared 335 with patient information and/or medical information (such as allergy, drug interaction or overdose information) stored in a relational database.

Further, the application specific information and/or permanent number read and decoded/recorded 310 from the smart tags may be linked 340 with a relational database (e.g., by local computer or network) to be stored therein and/or compared with similar information previously stored therein. If such information is not available in a local computer or via a network link, connection 345 may be made via the Internet to a remote relational database and the information is stored and/or compared as described, wherein access to such relational database is controlled by password, access code, encryption or other security means.

If a match of the information read 310, 320 and/or the information obtained 340, 345 from the relational database is confirmed, that information and a confirmation of a match is displayed 350. If the information does not match in any respect, the differences between the information read 310, 320 from the smart tags, the information obtained 340, 345 from either a local or remote relational database is displayed 355 and preferably is highlighted or otherwise made apparent to alert or give alarm to appropriate personnel. If no application specific information is found on either or both smart tags, then a notice thereof is displayed 360 and any information in the relational database related by smart tag permanent number may also be displayed 360.

Figure 8:
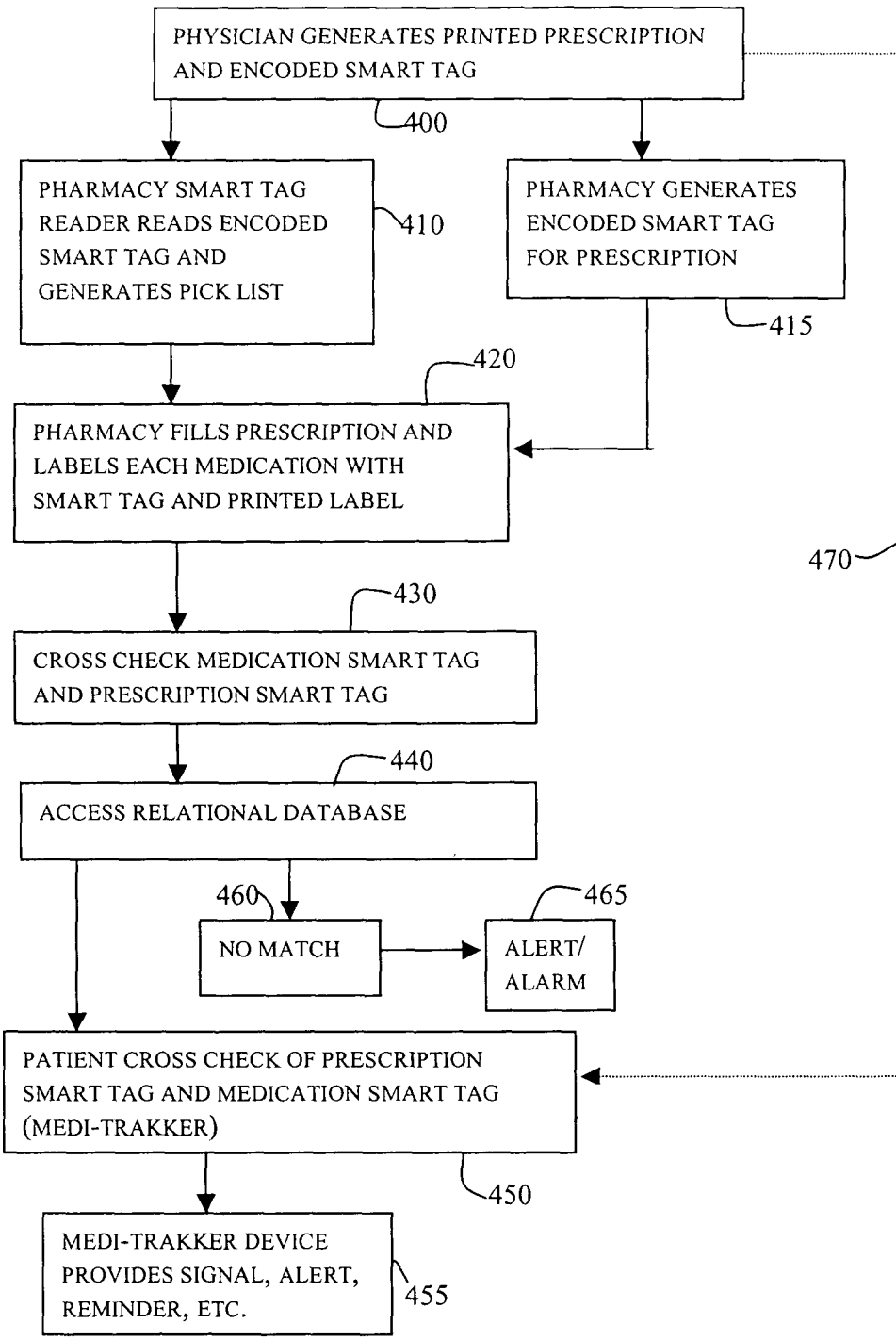

FIG. 8 is a flow chart schematic diagram illustrating another example of an alternative tracking system and method in accordance with the invention in an environment for processing medicine. A physician generates 400 a prescription or order embodied in a printed prescription or order with and encoded smart tag attached, wherein the smart tag is encoded 400 with the prescription information (e.g., medication, dosage, frequency, number of refills, etc.), patient information (e.g., name, address, etc.), and physician information (e.g., name, address, license number, etc.). In addition to the foregoing information essential for the prescription to be filled, other information such as patient allergies, age, insurance, illness or disease or condition, diagnostic information, and the like.

In filling the prescription, a smart tag reader at the pharmacy or other dispenser reads 410 the prescription smart tag and produces or generates 410 a pick list from which a pharmacist or other dispensing agent can fill the prescription. The pharmacy fills the prescription and labels 420 each item dispensed with a smart tag in which is stored the medication and prescription information. The pharmacy also applies a conventional human-readable printed label which may also include bar-coded information. If the physician does not generate a smart tagged prescription, then the pharmacy encodes 415 one or more prescription smart tags as it generates the pick list from which is fills 420 the order.

When the prescription is filled, the medication smart tag and prescription smart tag are read and cross checked 430 for completeness and accuracy, e.g., being placed in a tracking station as described herein, for example, a station referred to as a SMART-TRAKKER™ tracking station by Avante International Technology. If an error is found (no match) 460, an alert or alarm is provided 465. Such reader maybe linked to access 440 a relational database for comparing the information read from the smart tags with a medical database for verifying and/or identifying allergy, drug interaction, diagnostic or other information. Any potential problems or concerns generate a warning or alert 440 to the pharmacist so that consultation with the physician may be had.

Where the SMART-TRAKKER™ tracking station includes a smart tag reader/writer, as is preferred, information may be written 440 to the smart tags as well as read therefrom. For example, when a prescription is filled, the SMART-TRAKKER™ tracking station can read the number of refills permitted or remaining from the prescription smart tag, subtract one therefrom and write 440 the then remaining number of refills to the memory of the prescription smart tag.

The present invention also provides an opportunity for the patient to confirm the correctness of his prescriptions and/or receive assistance in the proper administration thereof To that end, a patient may have a personal smart tag reading device, sometimes referred to as a MEDI-TRAKKER™ device by Avante International Technology, that at least reads the medication and prescription smart tags and compares or cross checks 450 the information read therefrom to provide an indication of whether the smart tags match or do not match. This permits the patient to independently confirm that the medication and prescription smart tags indicate that the proper medication was dispensed. Such device is particularly useful in the case where the physician issues 400 a prescription with an encoded smart tag affixed, but the pharmacy does not use 470 the smart tag to verify the medication dispensed even though a medication smart tag is associated with the medication.

The MEDI-TRAKKER™ device for personal or home use may include all of the apparatus of the SMART-TRAKKER™ tracking station described above, or may be a simplified device. For example, a simplified MEDI-TRAKKER™ device need only include a basic smart tag reader and a simple processor for comparing a limited portion of the application specific information read from medication and prescription smart tags, and so could be relatively inexpensive and affordable. The antenna associated therewith need not be one that has substantially 100% reading rate irrespective of smart tag orientation, but may be a simpler inexpensive antenna.

A MEDI-TRAKKER™ device having additional features provides the patient with a display of the information read from the smart tags, and/or provides 455 a reminder (e.g., visual or audible alarm) of times to take medication. In such case, the MEDI-TRAKKER™ device includes an acknowledgment or confirmation button or other input device by which the patient can indicate to the MEDI-TRAKKER™ device the fact that the medication was taken and the time thereof. A MEDI-TRAKKER™ device yet further capability could, for example, either include or be coupled to a computer or other processor, e.g., a laptop computer, which includes a relational data base of patient information and/or medical information for providing 455 reminders, signals and alerts of times and dosages of medications to take, reminders to obtain refills or physician re-authorization, and/or possible allergic reactions, drug interactions, inappropriate treatments and the like.

Figure 9:
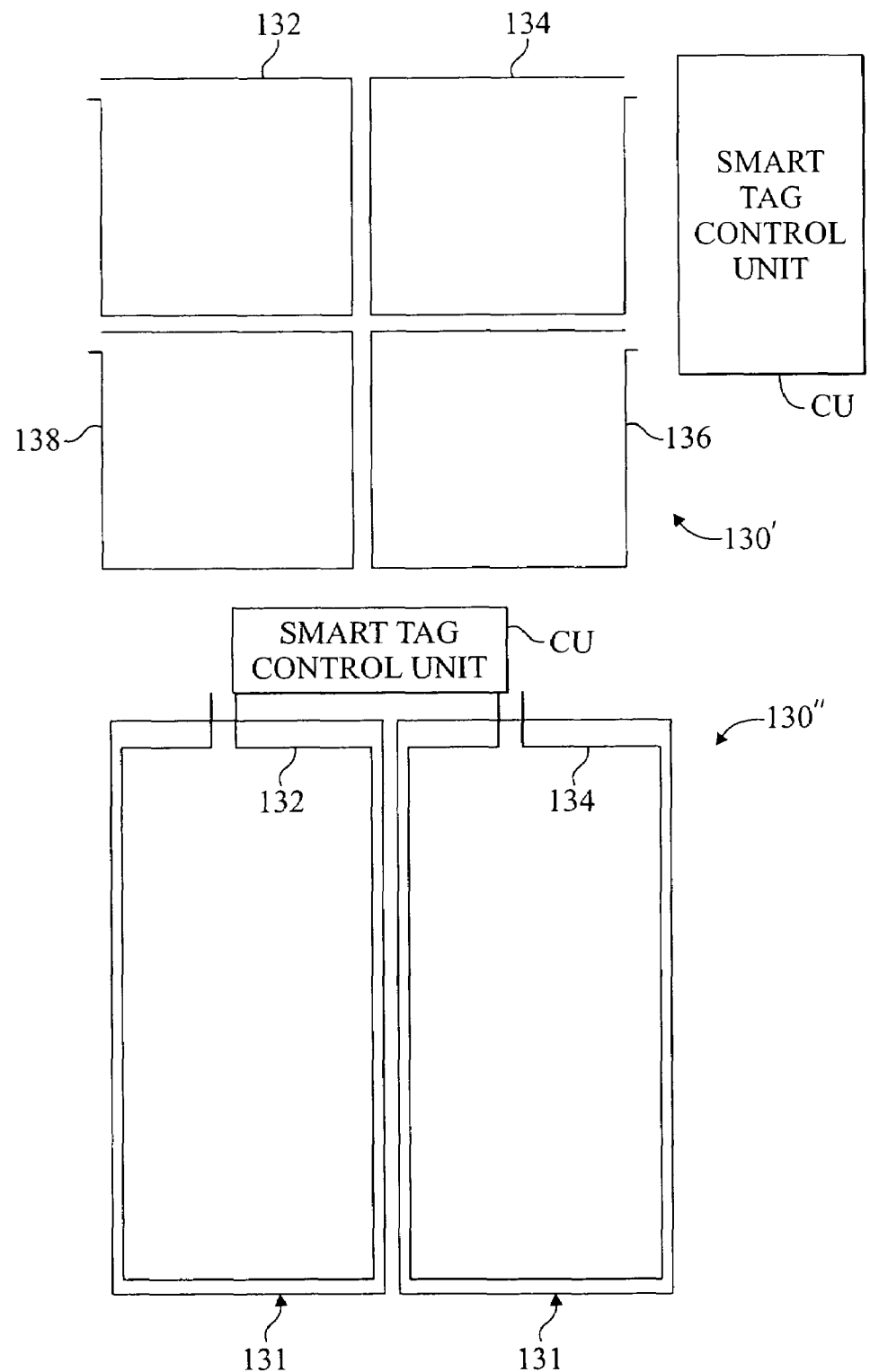
FIG. 9 is a schematic diagram of examples of antenna suitable for use with the invention.

FIG. 9 is a schematic diagram of examples of antenna arrays 44 (designated 44' and 44") suitable for use with the invention. Each antenna array 44 comprises a plurality of antenna 44-1, 44-2, 44-3, 44-4, . . . 44-N disposed or arrayed in respective orientations so as to produce, when transmitting, an electromagnetic field in the detection region having components in each of three orthogonal directions, and so as to be responsive to, when receiving, an electromagnetic field in the detection region having components in each of three orthogonal directions. Because each array 44 includes a plurality of antenna, preferably loop antenna, 44-1, 44-2, 44-3, 44-4, . . . the antenna may be conveniently be attached to and supported by existing structure at each station 20 or may be supported by a supporting structure provided for that purpose. Typically, the antenna 44-1, 44-2, 44-3, 44-4, . . . of the antenna array 44 are spaced apart and are disposed to surround the space defined as the detection region.

Because the relevant electromagnetic field has components in each of three orthogonal directions, communication between at least one of the antennas 44-1, 44-2, 44-3, 44-4, . . . 44-N of the antenna array 44 and the antenna of a smart tag 200 in the detection region is possible regardless of the orientation of the smart tag. As a result, there is a high degree of confidence that information is correctly from read from and/or written to the tag or tags 200 present in the detection region. Such antenna array is sometimes referred to as an "all-orientation" antenna array.

In particular, the antenna array 44' at the top of FIG. 9 includes four antenna loops 44'-1, 44'-2, 44'-3, 44'-4 coupled to smart tag control unit CU for reading information from and writing information to a smart tag 200. The four antenna loops 44'-1, 44'-2, 44'-3, 44'-4 may be disposed in planes defining the sides of a parallelepiped-shaped detection region, preferably with at least one of the loop antenna disposed so that the smart tag 200 moves through the central region of the loop. The antenna loops 44'-1, 44'-2, 44'-3, 44'-4 may be crossed one over the other or over itself so as to have conductors that appear to form a "net" or that appear to be "knitted" and one or more of the loops may be skewed at an angle of about 45° to 135° with respect to one or more of the other loops.

Figure 10A:
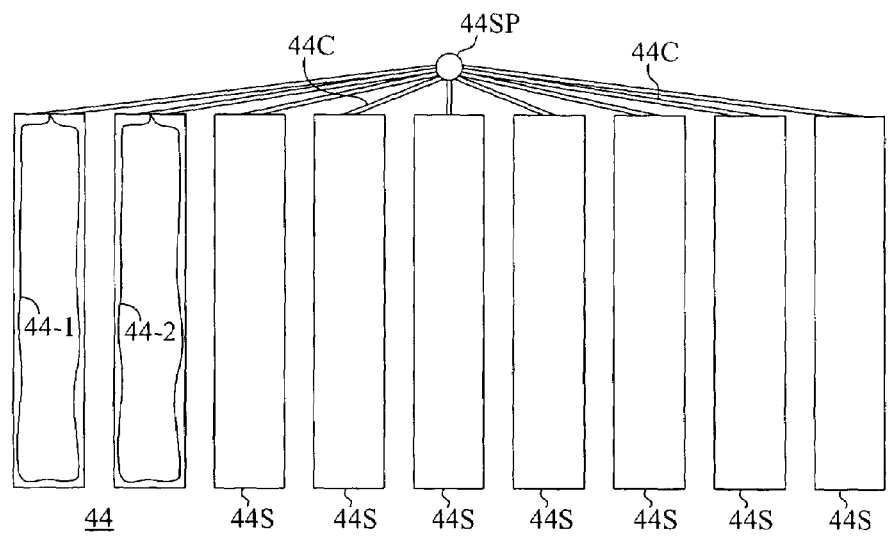
FIGS. 10A, 10B and 11 are schematic diagrams of examples of antenna arrays suitable for use with the invention.

The antenna array 44" at the bottom of FIG. 9 includes a plurality pf antenna loops 44"-1, 44"-2, 44"-3, 44"-4 (only two shown) coupled to smart tag control unit CU for reading information from and writing information to a smart tag 200. The plural antenna loops 44"-1, 44"-2, . . . are disposed on flexible plastic planar sheets 44S that are hung together side by side as a segmented flexible curtain to cover the opening of an entrance, exit or other access way that defines detection region, for example, as illustrated by FIG. 10A. Antenna loops 44"-1, 44"-2, . . . are coupled via coaxial cables 44C to splitter 44SP for coupling electrical signals thereto. It is noted that because antennas 44"-1, 44"-2, . . . are on flexible plastic substrate segments 44S, they also provide a cover for the access way similar to conventional plastic doorway curtains.

Figure 10B:
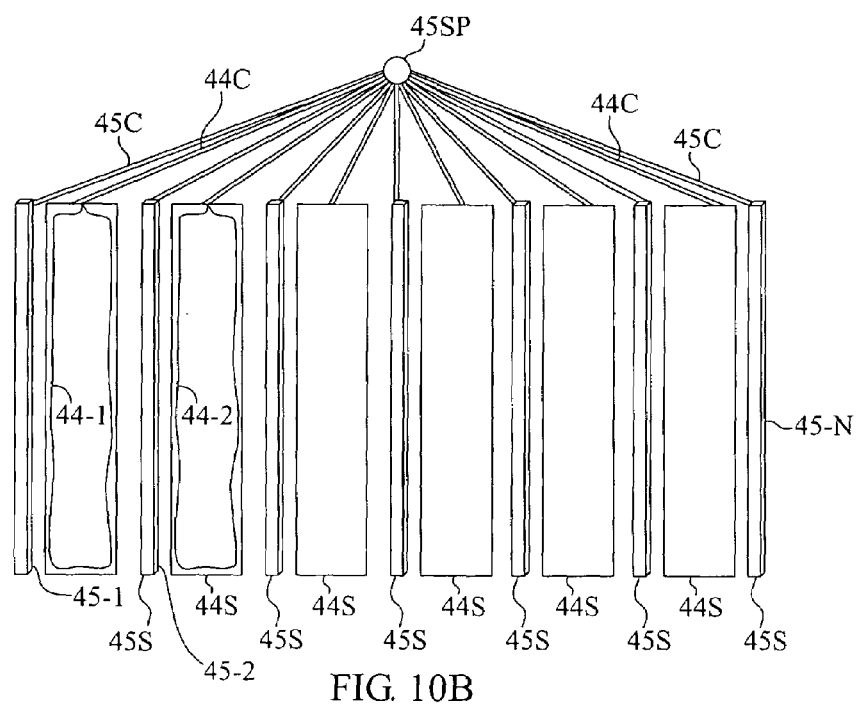

As illustrated in the antenna array 45 shown in FIG. 10B, additional similar antenna loops 45-1, 45-2, . . . disposed on additional flexible plastic sheets 45S hung in between (alternating with) and substantially perpendicular with the sheets 44S that form a curtain. Antenna loops 44"-1, 44"-2, . . . are coupled via coaxial cables 45C to splitter 45SP for coupling electrical signals thereto. Sheets 45S may or may not intersect the plane that contains sheets 44S. Additional loop antenna 44"-1, 44"-2, . . . improve antenna 45 operation under some conditions, but are optional. The flexible planar sheets 44S, 45S are parted and move when an article or articles pass through the access way so as to move ones of the loop antenna 44"-1, 44"-2, . . . and/or loop antenna 45-1, 45-2, . . . on the plastic sheets to different orientations so that at least one of the loop antenna becomes disposed to read information from and/or write information to smart tag 200 as the article(s) move(s) through the access way.

To avoid interaction or interference between transmission and/or reception by the various ones of the antenna 44-1, 44-2, . . . and 45-1, 45-2, . . . of the antenna array 44 or 45, the antenna 44-1, 44-2, . . . and 45-1, 45-2, . . . are loop antenna arranged with spatial or temporal separation. That is the loop antenna are typically spaced apart so as to be spatially separated or are activated and/or enabled sequentially in time so that one antenna is active (i.e. transmitting or receiving) at any given time and is independent of the others when active. Antenna sequencing and timing may be provided and/or controlled by control unit CU or by control unit CU in conjunction with one or more of processors and may be coordinated with other sequenced antenna arrays 44 such as via a distribution hub or other coupling path.

In the temporally separated loop antenna, the time in the antenna activation sequence for which any one antenna is active for transmitting and/or receiving information (i.e. the "dwell time") is typically between about 150 and 350 milliseconds. Antenna sequencing is established at a rate sufficiently high so that all of the antennas are activated within the minimum time that a moving article to be detected is within the detection region. The sequencing rate is typically about 0.5 to 2 complete sequences per second, so that the duration of each complete sequence (i.e. the "cycle time") is about 500 to 2000 milliseconds.

Where the antenna loops are spatially separated, either in place of temporal separation or in addition thereto, the spatial separation is typically sufficient when less than about 50% of the effective electromagnetic field region overlaps within the detection region.

Figure 11:
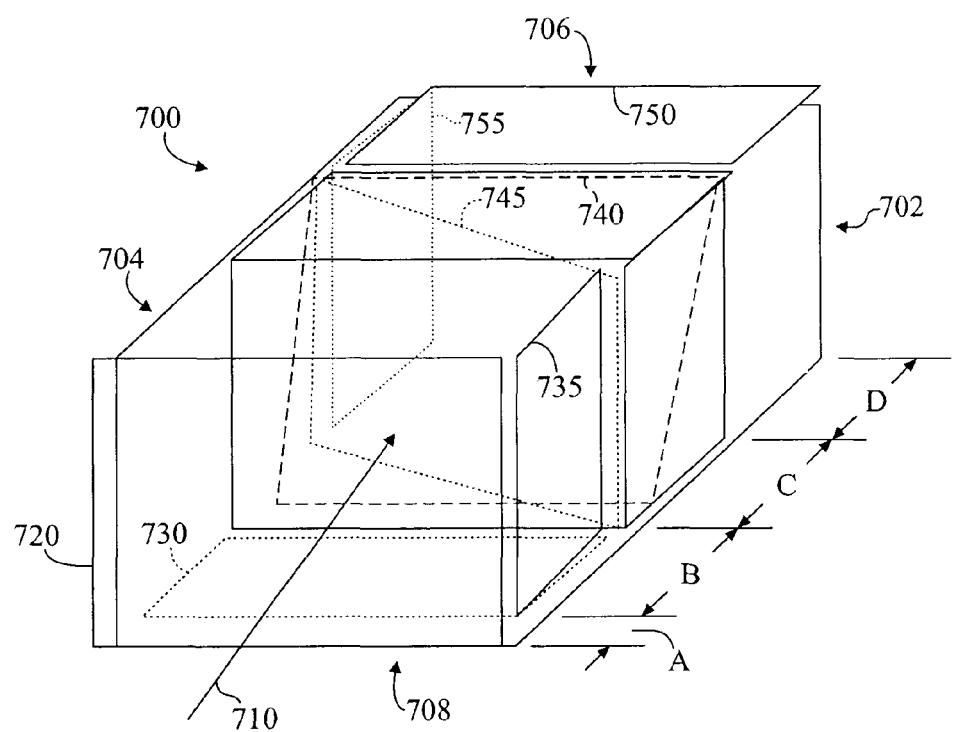

FIG. 11 is a schematic diagram of an example of an antenna array 700 suitable for use with the invention. Antenna array 700 includes a plurality of loop antenna 720–755, disposed around and proximate to the transport path 710 of an object including a smart tag. Specifically, loop antenna 720–755 define a parallelepiped "tunnel" of passage having right and left sides 702 and 704, top 706 and bottom 708. One direction of travel is indicated by the arrow of transport path 710, but the opposite direction of travel may also be used. Antenna loops 720–755 are disposed in a plurality of spatially separated regions of antenna array 700 indicated by the letters A, B, C and D.

Antenna loop 720 is disposed in region A of antenna array 700 to surround transport path 710 so that the object including a smart tag passes through loop 720. Antenna loop 720 is optional where the smart tags are of sufficient size to sufficiently couple transmitted electromagnetic signals to others of antenna loops 730–755.

Antenna loops 730 and 735 are disposed adjacent to transport path 710 on bottom 708 and on side 702, respectively, in region B of antenna array 700. Loops 730 and 735 are substantially perpendicular (e.g., at about 80° to 100°) to each other so as to sufficiently couple transmitted electromagnetic signals as the object including a smart tag is proximate thereto. Similarly, but spatially separated therefrom, antenna loops 750 and 755 are disposed adjacent to transport path 710 on top 706 and on side 704, respectively, in region D of antenna array 700. Loops 750 and 755 are substantially perpendicular (e.g., at about 80° to 100°) to each other so as to sufficiently couple transmitted electromagnetic signals as the object including a smart tag is proximate thereto. Together, antenna loops 730. 750, 735, 755 are on the bottom, top and both sides 702, 704 to together surround transport path 710.

Antenna loops 740 and 745 are disposed to each surround transport path 710 in region C of antenna array 700, similarly to loop 720 of region A. Loops 740 and 745 are skewed or rotated so as to not be substantially perpendicular to transport path 710, but to be skewed at an angle of about 45° to 135° with respect thereto. Loop 740 is rotated or skewed in a direction about a vertical line and loop 745 is rotated or skewed about a horizontal direction so as to appear to lean or be tilted. As a result, loop antenna 740, 745 are disposed in skewed fashion so as to sufficiently couple transmitted electromagnetic signals as the object including a smart tag is proximate thereto in an orientation not likely to couple efficiently to, e.g., antenna loops 730, 735, 750 and 755. Antenna loops 740 and/or 745 are optional where the smart tags are of sufficient size to sufficiently couple transmitted electromagnetic signals to others of antenna loops 720–735 and 750–755.

While various temporally and/or spatially separated antenna array arrangements may be utilized with the present invention, other examples of suitable antenna arrays are described in detail in Applicant's co-pending U.S. patent application Ser. No. 09/854,722 entitled "ANTENNA ARRAY FOR SMART RFID TAGS" filed on May 14, 2001, which is hereby incorporated herein by reference in its entirety. Examples of typical smart tags suitable for use with the present invention are described and shown in Applicant's co-pending U.S. patent applications Ser. No. 09/412,058 entitled "ARTICLE HAVING AN EMBEDDED ELECTRONIC DEVICE, AND METHOD OF MAKING SAME" filed Oct. 4, 1999, Ser. No. 09/411,849 entitled "WIRELESS ARTICLE INCLUDING A PLURAL-TURN LOOP ANTENNA" filed Oct. 4, 1999, and Ser. No. 09/671,923 entitled "TAMPER-RESISTANT WIRELESS ARTICLE INCLUDING AN ANTENNA" filed Sep. 28, 2000.

While the present invention has been described in terms of the foregoing exemplary embodiments, variations within the scope and spirit of the present invention as defined by the claims following will be apparent to those skilled in the art. For example, many different combinations of smart tags, antenna arrays, reader/writer units, communication devices and processors may be employed in making and using the system and in practicing the method of the present invention. Antenna arrays may be provided in any kind of area such as storage bins, containers, cargo areas and holds, as well as other places whether or not described herein.

Smart tags of various types may be utilized as convenient. For example, a smart tag may have a polyimide substrate with solid copper conductors thereon and nickel-gold metal plated interconnection pads, with the electronic chip connected to the interconnection pads with a high-temperature flexible conductive adhesive. Smart tags may be packaged to prevent moisture, chemicals and solvents from reaching and attacking the operating elements of the smart tag.

In any of the examples described, one or more of the smart tags may be collected, erased and reused. Where a dispenser of medication, or of a medical implement or device is required to keep the original prescription or order therefor, a copy of the prescription or order including the original smart tag or a duplicate smart tag encoded to match the original smart tag may be provided. In another utilization, identification bracelets including smart tags are issued to mother and baby in a hospital or birthing center at the time of birth. Each smart tag has related data stored therein for verifying, e.g., at feeding time and/or release, that the mother's and baby's tags match, whereby the mother has the baby born to her.

Optionally, but preferably, the same information is both transmitted to the smart tag and stored in its memory and stored in the memory of the tracking station. Thus, both the smart tag and the tracking station have the same information pertaining to that object and that station. Any other desired information may likewise be transmitted and stored in the smart tag. Where plural tags may be present in the smart tag detection region of a station at the same time, conventional smart tag "collision-avoidance" or "anti-collision" techniques are employed.

It should be noted that the tracking stations may include any number and types of locations, as may be necessary, convenient or desirable in the processing, transport and use of any given object. The stations need not be located in proximity to each other, but may be in separate buildings or facilities, at different locations and even widely dispersed geographically, and need not be under the ownership and/or control of any one person or entity.

The smart tags may be adhesive tags that adhere to an object in a way that renders them tamper resistant or may be included in an anti-theft devise, such as the relatively large conventional reusable circular anti-theft devices available from Check-Point Systems of Thorofare, N.J., typically utilized in retail clothing stores. These conventional anti-theft devices may be large so as to be obvious and not be removable without damaging the object unless removed using a special tool or release device generally not available to the public. Typically, a smart tag is configured to fit inside such conventional anti-theft device so that the anti-theft-device and the smart tag cooperate to reduce theft and lost or misplaced objects.

What is claimed is:

1. A system for tracking first and second objects associated respectively with first and second smart tags, comprising:
   a plurality of smart tag readers for providing and/or receiving information-bearing electrical signals in a smart tag format, wherein at least one of the plurality of smart tag readers is associated with a tracking location and one of the plurality of smart tag readers is associated with a destination location,
   wherein each of the plurality of smart tag readers produces information signals representative of information contained in the received information-bearing electrical signals and/or inserts information contained in information signals into the transmitted information-bearing electrical signals;
   a plurality of antenna operatively coupled to respective ones of the plurality of smart tag readers for transmitting and/or receiving the information-bearing electrical signals in a detection region proximate one of a tracking location and a destination location associated therewith,
   at least some of said plurality of antenna including a plurality of loop antenna arranged with spatial or temporal separation for coupling the information-bearing signals between the smart tag reader and a smart tag in the detection region with substantially 100% reading rate;
   at least first and second smart tags associated with first and second objects,
   the first and second smart tags each including an electronic memory and an antenna coupled to the electronic memory for transmitting and/or receiving information-bearing electrical signals in the smart tag format,
   wherein the information-bearing electrical signals represent information to be stored in the electronic memory and/or represent information produced from the electronic memory;
   wherein the information stored in and the information produced from the electronic memory of each smart tag includes a permanent number, application specific data and a relational check number representative of the permanent number or of the permanent number and the application specific data;
   whereby information is communicated between the electronic memory of the smart tag and the smart tag reader of a particular location when the smart tag is in the detection region of that particular location; and
   a computer processor for processing at least information signals from the smart tag reader at the destination location for comparing information including application specific data and relational check numbers read from the electronic memories of the first and second smart tags for providing an indication of a match or of lack of a match thereof.

2. The system of claim 1 wherein the information contained in the information-bearing signals is representative of one or more of:
   the identity of any one or more of: the smart tag, the object, the location, a passenger, a passenger and his baggage, an object of transport, the owner of an object of transport, a recipient of an object of transport, a mode of transport or travel, a route of transport or travel, a prescription, an order, a medication, an implement, a medical implement, and a medical device; and
   a date, and a time.

3. The system of claim 1 wherein the information contained in the information signals is communicated to and is stored in both the computer processor and the electronic memory of at least one of the first and second smart tags.

4. The system of claim 1 wherein at least one of the plurality of antenna comprises a plurality of loop antenna disposed on flexible substrates providing a flexible curtain at an access way.

5. The system of claim 1 wherein at least one of the plurality of antenna comprises a plurality of loop antenna that are one of:
   spatially separated such that less than about 50% of the effective electromagnetic field region of the respective loop antenna overlaps within the detection region, and
   temporally separated by being activated sequentially in time.

6. The system of claim 1 wherein said computer processor includes a central processor in communication with one or more local processors in communication with the smart tag readers.

7. The system of claim 1 wherein said computer processor provides a human perceivable indication responsive to the presence of said first and second smart tags within the detection region of the antenna at the destination location.

8. The system of claim 7 wherein the human perceivable indication is provided responsive to lack of a match of information from said first and second smart tags.

9. The system of claim 7 wherein the human perceivable indication includes one of a light, an audible alarm, an anti-theft alarm, a display on a computer monitor and a print out.

10. The system of claim 1 further comprising communication means for communicating the information signals between said computer processor and at least one of said plurality of smart tag readers.

11. The system of claim 10 wherein said communication means comprises one or more of wire, cable, optical fiber, radio or RF transmission, a local area network (LAN), a wide area network (WAN), the Internet, and a combination thereof.

12. The system of claim 1 wherein at least one of the tracking and destination locations includes one of a travel facility, a travel terminal, a baggage facility, a baggage checking facility, matching a passenger and his baggage, medical facility, a hospital, a pharmacy, a warehouse, a manufacturing facility, a processing facility, a display, a storage bin, entrance and exit gates, a vehicle, an airplane, a ship, a train, a truck, a container, a storage container, a transport container, and a terminal associated with any of the foregoing.

13. The system of claim 1 wherein the first object is a passenger and the second object is the passenger's baggage, wherein said computer processor matches the passenger and the passenger's baggage before departure of a conveyance carrying at least one of the passenger and the passenger's baggage.

14. A method for associating first and second objects at a destination location, wherein a smart tag is associated with each of the first and second objects, comprising:
   providing first and second smart tags having information stored therein relating to both of the first and second objects, wherein the information is stored in each smart tag in a form including a permanent number, application specific data and a relational check number representative of the permanent number or of the permanent number and the application specific data;

associating the first and second smart tags with the first and second objects, respectively;

associating the first and second smart tags at the destination location;

reading at the destination location the information stored in the first and second smart tags including application specific data and a relational check number;

processing the information read from both the first and second smart tags including application specific data and relational check numbers for determining whether the information read includes the information relating to the first and second objects; and providing an indication of whether the information read includes the information relating to the first and second objects.

15. The method of claim 14 wherein said providing first and second smart tags includes storing information in the first and second smart tags relating to both of the first and second objects.

16. The method of claim 14 wherein the information stored in the first and second smart tags includes at least one of:

the identity of any one or more of: the first and second smart tags, one of the first and second objects, the destination location, a passenger, a passenger and his baggage, an object of transport, the owner of an object of transport, an recipient of an object of transport, a mode of transport or travel, a route of transport or travel, a prescription, an order, a medication, an implement, a medical implement, and a medical device; and a date, and a time.

17. The method of claim 14 further comprising, at one or more tracking locations, reading the information stored in at least one of the first and second smart tags.

18. The method of claim 17 wherein said processing further comprises processing the information read at the one or more tracking locations for tracking the at least one of the first and second smart tags.

19. The method of claim 17 further comprising communicating the information read at the one or more tracking locations to a processor.

20. The method of claim 19 wherein said communicating comprises sending information signals via one or more of wire, cable, optical fiber, radio or RF transmission, a local area network (LAN), a wide area network (WAN), the Internet, and a combination thereof.

21. The method of claim 14 wherein said providing an indication comprises providing a human perceivable indication including one of a light, an audible alarm, an anti-theft alarm, a display on a computer monitor and a print out.

22. The method of claim 14 wherein the first object is a passenger and the second object is the passenger's baggage, further comprising:

carrying at least one of the passenger and the passenger's baggage on a conveyance;

wherein said processing includes matching the passenger and the passenger's baggage before departure of the conveyance.

23. The method of claim 22 wherein said providing an indication includes providing the indication when the passenger and the passenger's baggage do not match before departure of the conveyance.

24. A method for associating first and second objects at a destination location, wherein a smart tag is associated with each of the first and second objects, comprising:

providing first and second smart tags having information stored therein relating to both of the first and second objects;

associating the first and second smart tags with the first and second objects, respectively;

associating the first and second smart tags at the destination location;

reading at the destination location the information stored in the first and second smart tags;

processing the information read from both the first and second smart tags for determining whether the information read includes the information relating to the first and second objects; and providing an indication of whether the information read includes the information relating to the first and second objects; and at one or more tracking locations, storing information related to the tracking location in at least one of the first and second smart tags.

25. The method of claim 24 wherein the information related to the tracking location includes one or more of an identification of the tracking location, a location thereof, a time, a date, application specific data, and a relational check number representative of application specific data and/or a permanent number stored in the at least one of the first and second smart tags.

26. The method of claim 24 wherein said processing further comprises processing the information related to the tracking location for tracking the at least one of the first and second smart tags.

27. The method of claim 24 further comprising communicating the information related to the tracking location between the tracking location and a processor.

28. The method of claim 27 wherein said communicating comprises sending information signals via one or more of wire, cable, optical fiber, radio or RF transmission, a local area network (LAN), a wide area network (WAN), the Internet, and a combination thereof.

29. The method of claim 24 wherein at least one of the tracking and destination locations includes one of a travel facility, a travel terminal, a baggage facility, a baggage checking facility, matching a passenger and his baggage, a medical facility, a hospital, a pharmacy, a warehouse, a manufacturing facility, a processing facility, a display, a storage bin, an entrance and/or exit gate, a vehicle, an airplane, a ship, a train, a truck, a container, a storage container, a transport container, and a terminal associated with any of the foregoing.

30. Apparatus for associating first and second objects at a destination location, wherein a smart tag is associated with each of the first and second objects, comprising:

means for providing first and second smart tags having information stored therein relating to both of the first and second objects, wherein the information is stored in each smart tag in a form including a permanent number, application specific data and a relational check number representative of the permanent number or of the permanent number and the application specific data;

means for associating the first and second smart tags with the first and second objects, respectively;

means for associating the first and second smart tags at the destination location;

means for reading at the destination location the information stored in the first and second smart tags including application specific data and a relational check number;

means for processing the information read from both the first and second smart tags including application specific data and relational check numbers for determining whether the information read includes the information relating to the first and second objects; and means for providing an indication of whether the information read includes the information relating to the first and second objects.

31. The apparatus of claim 30 wherein said means for providing first and second smart tags includes means for storing information in the first and second smart tags relating to both of the first and second objects.

32. The apparatus of claim 30 wherein the information stored in the first and second smart tags includes at least one of:
the identity of any one or more of: the first and second smart tags, one of the first and second objects, the destination location, a passenger, a passenger and his baggage, an object of transport, the owner of an object of transport, an recipient of an object of transport, a mode of transport or travel, a route of transport or travel, a prescription, an order, a medication, an implement, a medical implement, and a medical device; and a date, and a time.

33. The apparatus of claim 30 further comprising, at one or more tracking locations, means for reading the information stored in at least one of the first and second smart tags.

34. The apparatus of claim 33 wherein said means for processing further comprises means for processing the information read at the one or more tracking locations for tracking the at least one of the first and second smart tags.

35. The apparatus of claim 33 further comprising means for communicating the information read at the one or more tracking locations to a processor.

36. The apparatus of claim 33 wherein said means for communicating comprises means for sending information signals via one or more of wire, cable, optical fiber, radio or RF transmission, a local area network (LAN), a wide area network (WAN), the Internet, and a combination thereof.

37. The apparatus of claim 30 wherein said means for providing an indication comprises means for providing a human perceivable indication including one of a light, an audible alarm, an anti-theft alarm, a display on a computer monitor and a printout.

38. The apparatus of claim 30 wherein the first object is a passenger and the second object is the passenger's baggage, wherein means for processing matches the passenger and the passenger's baggage before departure of a conveyance carrying at least one of the passenger and the passenger's baggage.

39. The apparatus of claim 38 wherein said means for providing an indication includes means for providing the indication when the passenger and the passenger's baggage do not match before departure of the conveyance.

40. Apparatus for associating first and second objects at a destination location, wherein a smart tag is associated with each of the first and second objects, comprising:
means for providing first and second smart tags having information stored therein relating to both of the first and second objects;
means for associating the first and second smart tags with the first and second objects, respectively;
means for associating the first and second smart tags at the destination location;
means for reading at the destination location the information stored in the first and second smart tags;
means for processing the information read from both the first and second smart tags for determining whether the information read includes the information relating to the first and second objects;
means for providing an indication of whether the information read includes the information relating to the first and second objects; and
at one or more tracking locations, means for storing information related to the tracking location in at least one of the first and second smart tags.

41. The apparatus of claim 40 wherein the information related to the tracking location includes one or more of an identification of the tracking location, a location thereof, a time, a date, application specific data, and a relational check number representative of application specific data and/or a permanent number stored in the at least one of the first and second smart tags.

42. The apparatus of claim 40 wherein said means for processing further comprises processing the information related to the tracking location for tracking the at least one of the first and second smart tags.

43. The apparatus of claim 40 further comprising means for communicating the information related to the tracking location between the tracking location and a processor.

44. The apparatus of claim 40 wherein said mean for communicating comprises sending information signals via one or more of wire, cable, optical fiber, radio or RF transmission, a local area network (LAN), a wide area network (WAN), the Internet and a combination thereof.

45. The apparatus of claim 40 wherein at least one of the tracking and destination locations includes one of a travel facility, a travel terminal, a baggage facility, a baggage checking facility, matching a passenger and his baggage, a medical facility, a hospital, a pharmacy, a warehouse, a manufacturing facility, a processing facility, a display, a storage bin, an entrance and/or exit gate, a vehicle, an airplane, a ship, a train, a truck, a container, a storage container, a transport container, and a terminal associated with any of the foregoing.

46. A system for matching at a destination first and second objects associated respectively with first and second smart tags, comprising:
at least first and second smart tags associated at an origin location with first and second objects, the first and second smart tags each including a memory;
at least one smart tag writer at the origin location for storing in the respective memories of said first and second smart tags information relating to both the first and second objects,
wherein the information stored in the memory of each of said first and second smart tags includes a permanent number stored therein that cannot be changed, the information relating to both the first and second objects, and a relational check number representative of the permanent number or of the permanent number and the information relating to both the first and second objects;
a smart tag reader at the destination location for reading information stored in the memory of a smart tag, wherein said smart tag reader reads information including a relational check number from the respective memories of said first and second smart tags; and
a processor for providing an indication of whether the information including relational check numbers read from the respective memories of said first and second smart tags both include the information relating to both the first and second objects.

47. The system of claim 46 further comprising an antenna associated with said smart tag reader including a plurality of loop antenna that are one of:

spatially separated such that less than about 50% of the effective electromagnetic field region of the respective loop antenna overlaps within the detection region, and temporally separated by being activated sequentially in time.

48. The system of claim 46 wherein the information relating to both the first and second objects is representative of one or more of:

the identity of any one or more of: the first and/or second smart tags, the first and/or second objects, the origin and/or destination locations, a passenger, a passenger and his baggage, the owner of the first and/or second objects, a recipient of the first and/or second objects, a mode of transport or travel, a route of transport or travel, a prescription, an order, a medication, an implement, a medical implement, and a medical device; and a date, and a time.

49. The system of claim 46 wherein said processor provides a human perceivable indication responsive to the presence of said first and second smart tags, wherein the human perceivable indication includes one of a light, an audible alarm, an anti-theft alarm, a display on a computer monitor and a print out.

50. The system of claim 46 wherein at least one of the origin and destination locations includes one of a travel facility, a travel terminal, a baggage facility, a medical facility, a hospital, a pharmacy, a warehouse, a manufacturing facility, a processing facility, a storage bin, an entrance and/or exit gate, a vehicle, an airplane, a ship, a train, a truck, a container, a storage container, a transport container, and a terminal associated with any of the foregoing.

51. The system of claim 46 wherein the first and second objects include:

baggage and a baggage check, a package and a package receipt, medication and a prescription, a medical device and a medical order, and a medical implement and a medical order.

52. The system of claim 46 wherein the first object is a passenger and the second object is the passenger's baggage, wherein said processor matches the passenger and the passenger's baggage before departure of a conveyance carrying at least one of the passenger and the passenger's baggage, and wherein the indication includes an indication of the match or lack of match thereof.

53. A system for matching at a destination baggage and a baggage check associated respectively with first and second smart tags, comprising:

at least first and second smart tags associated at an origin location with baggage and a baggage check, respectively, the first and second smart tags each including a memory;

at least one smart tag writer at the origin location for storing in the respective memories of said first and second smart tags information relating to at least one of the baggage and the baggage check;

wherein the information stored in the memory of each of said first and second smart tags includes a permanent number stored therein that cannot be changed, the information relating to both the baggage and the baggage check, and a relational check number representative of the permanent number or of the permanent number and the information relating to both the baggage and the baggage check;

a smart tag reader at the destination location for reading information stored in the memory of a smart tag, wherein said smart tag reader reads information from the respective memories of said first and second smart tags; and a processor processing the relational check numbers for verifying the permanent number and/or the information relating to both the baggage and the baggage check, said processor providing an indication of whether the information read from the respective memories of said first and second smart tags both include the information relating to at least one of the baggage and the baggage check, whereby the indication provided indicates whether the baggage and the baggage check match.

54. The system of claim 53 wherein said processor matches the baggage and the baggage check before departure of a conveyance carrying at least one of the passenger and the passenger's baggage.

55. A system for matching a passenger and the passenger's baggage associated respectively with first and second smart tags, comprising:

at least first and second smart tags associated at an origin location with a passenger and the passenger's baggage, respectively, the first and second smart tags each including a memory;

at least one smart tag writer at the origin location for storing in the respective memories of said first and second smart tags information relating to at least one of the passenger and the passenger's baggage;

wherein the information stored in the memory of each of said first and second smart tags includes a permanent number stored therein that cannot be changed, the information relating to both the passenger and the passenger's baggage, and a relational check number representative of the permanent number or of the permanent number and the information relating to both the passenger and the passenger's baggage;

at least one smart tag reader for reading information stored in the memory of a smart tag, wherein said smart tag reader reads information from the respective memories of said first and second smart tags before departure of a conveyance carrying at least one of the passenger and the passenger's baggage; and a processor processing the relational check numbers for verifying the permanent number and/or the information relating to both the passenger and the passenger's baggage, said processor providing an indication of whether the information read from the respective memories of said first and second smart tags both include the information relating to at least one of the passenger and the passenger's baggage, whereby the indication provided indicates whether the passenger and the passenger's baggage are on the conveyance before departure thereof.

56. The system of claim 55 further comprising:

a further smart tag reader at a destination location for reading information stored in the memory of a smart tag, wherein said smart tag reader reads information from the respective memories of said first and second smart tags; and a further processor at the destination location for providing an indication of whether the information read from the respective memories of said first and second smart tags both include the information relating to at least one of the passenger and the passenger's baggage, whereby the indication provided indicates whether the passenger and the passenger's baggage match.

* * * * *